US008867324B2

(12) United States Patent
Sekiguchi et al.

(10) Patent No.: US 8,867,324 B2
(45) Date of Patent: Oct. 21, 2014

(54) REPRODUCING DEVICE AND REPRODUCING METHOD

(71) Applicant: Sony Corporation, Tokyo (JP)

(72) Inventors: Koji Sekiguchi, Kanagawa (JP); Takahiro Miura, Kanagawa (JP); Kimihiro Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/953,809

(22) Filed: Jul. 30, 2013

(65) Prior Publication Data
US 2014/0036651 A1    Feb. 6, 2014

(30) Foreign Application Priority Data

Aug. 6, 2012  (JP) .................................. 2012-173960

(51) Int. Cl.
G11B 7/00       (2006.01)
G11B 7/007      (2006.01)
G11B 7/005      (2006.01)
G11B 7/24079    (2013.01)
G11B 7/1353     (2012.01)
G11B 7/1356     (2012.01)

(52) U.S. Cl.
CPC ........ G11B 7/00718 (2013.01); G11B 7/24079 (2013.01); G11B 7/0051 (2013.01); G11B 7/1353 (2013.01); G11B 7/1356 (2013.01)
USPC .................. 369/44.26; 369/44.37; 369/44.41; 369/112.01

(58) Field of Classification Search
None
See application file for complete search history.

(56) References Cited

U.S. PATENT DOCUMENTS

| 2004/0066715 | A1* | 4/2004 | Buchler ..................... | 369/44.37 |
| 2008/0067321 | A1* | 3/2008 | Miyamoto et al. ......... | 250/201.5 |
| 2008/0205246 | A1* | 8/2008 | Shimano et al. ......... | 369/112.29 |
| 2010/0039917 | A1* | 2/2010 | Ide ................................ | 369/100 |
| 2012/0008483 | A1* | 1/2012 | Mikami ..................... | 369/112.17 |
| 2012/0213046 | A1* | 8/2012 | Yamazaki .................. | 369/44.32 |
| 2013/0128709 | A1* | 5/2013 | Ito et al. .................... | 369/53.35 |
| 2013/0135978 | A1* | 5/2013 | Ide ............................. | 369/53.28 |

FOREIGN PATENT DOCUMENTS

JP    2008-065961 A    3/2008
JP    2008-269680 A    11/2008

* cited by examiner

Primary Examiner — Thang Tran
(74) Attorney, Agent, or Firm — Wolf, Greenfield & Sacks, P.C.

(57) ABSTRACT

A reproducing device includes a light generation and emission unit that obtains signal light as reflection light, which reflects recording signals of a land and a groove, by irradiating an optical recording medium with light and generates reference light so as to emit the signal light and the reference light in a superposed manner, a detection optical system that generates a first combination of signal light and reference light, a second combination of signal light and reference light, a third combination of signal light and reference light, and a fourth combination of signal light and reference light respectively, a light receiving unit in which the first to fourth combinations of signal light and reference light are respectively received by first to fourth light receiving elements, and a reproduction unit that reproduces the recording signals of the land and the groove on the basis of first to fourth light receiving signals.

4 Claims, 18 Drawing Sheets

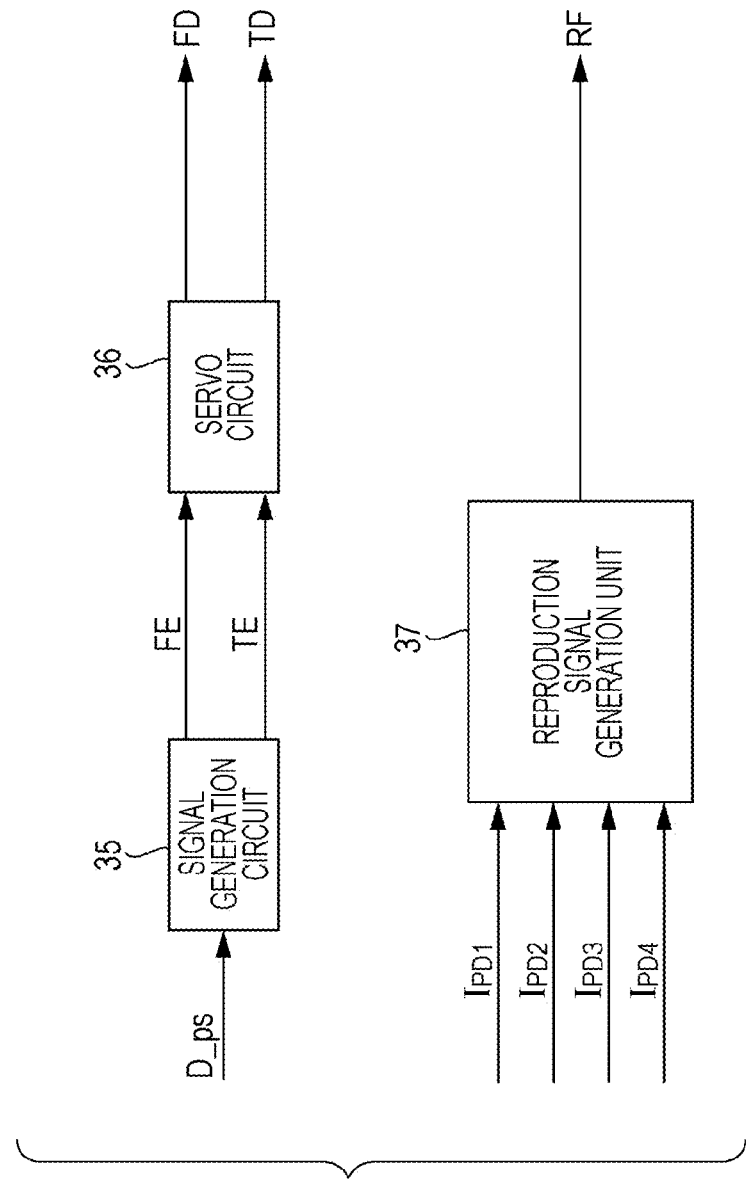

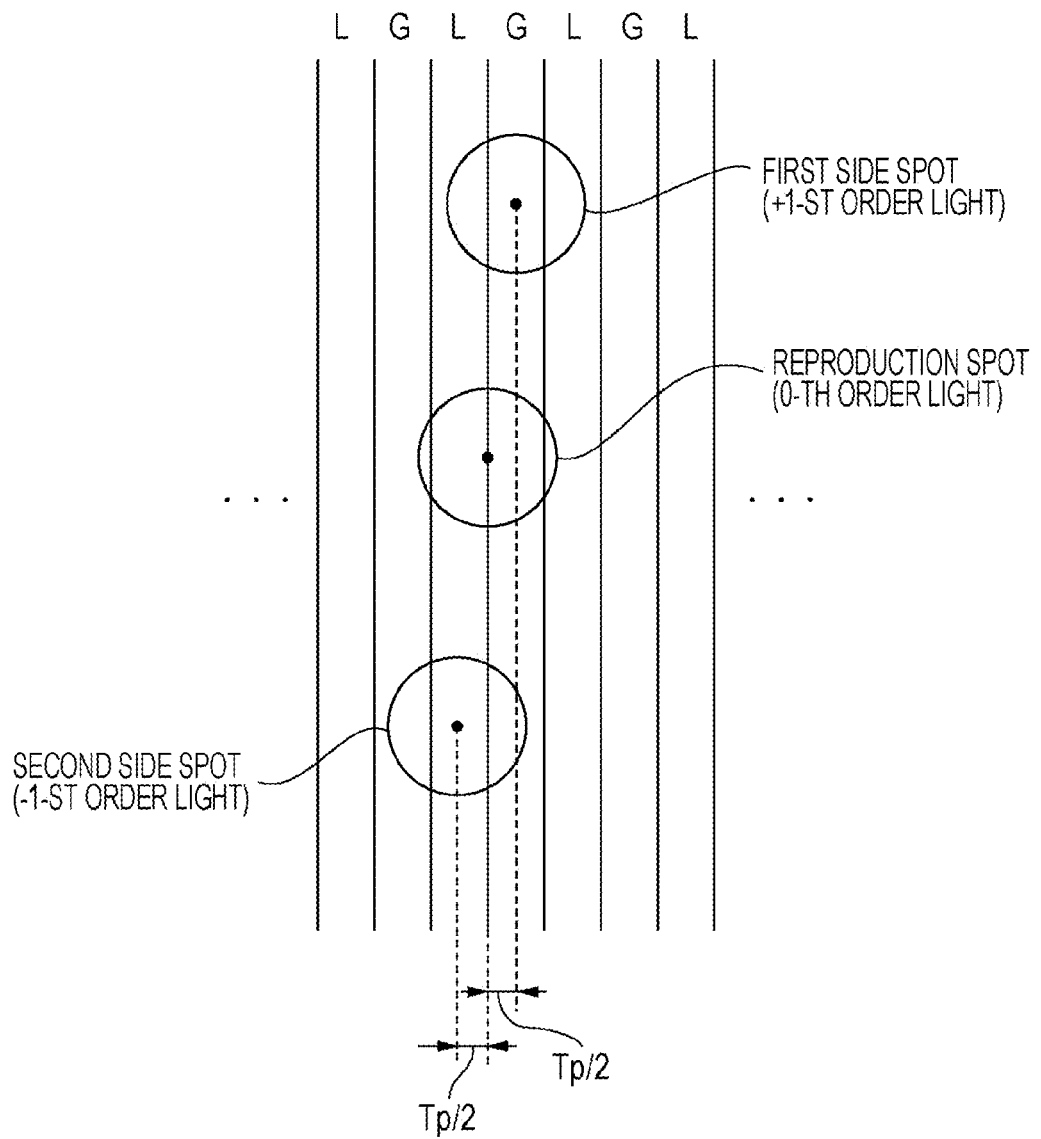

REPRODUCING DEVICE AND REPRODUCING METHOD

CROSS REFERENCE TO RELATED APPLICATIONS

The present application claims priority under 35 U.S.C. § 119 to Japanese Patent Application No. JP 2012-173960, filed in the Japan Patent Office on Aug. 6, 2012, the entire contents of which are incorporated herein by reference.

BACKGROUND

The present technology relates to a reproducing device and a reproducing method in which a signal reproduction is performed by so-called homodyne detection.

Japanese Unexamined Patent Application Publication No. 2008-269680 and Japanese Unexamined Patent Application Publication No. 2008-65961 are examples of related art.

So-called optical disc recording media (also referred to merely as optical discs) such as a compact disc (CD), a digital versatile disc (DVD), and a Blu-ray Disc® (BD) have been widely used as optical recording media in which a signal is recorded/reproduced by irradiation of light.

It has been desired to improve recording density to increase recording capacity of optical discs.

For example, a method in which a recording layer of an optical disc is formed in a multilayered structure so as to increase recording density in a layering direction and a method in which a recording pitch (track pitch) in a radius direction is narrowed so as to increase recording density are employed.

SUMMARY

Here, regarding the method for realizing high recording density by narrowing a track pitch, it is conceivable to further increase recording capacity by employing a narrow pitch which exceeds an optical limit value.

Here, when a reproduction wavelength is denoted as $\lambda$ and a numerical aperture of an objective lens is denoted as NA, an optical limit value is expressed as approximately "$\lambda/NA/2$". This "$\lambda/NA/2$" is a logical value, and an actual optical limit value is larger than "$\lambda/NA/2$". In a case of a BD which is reproduced in a condition of $\lambda=405$ nm and NA=0.85, for example, an actual optical limit value is approximately 0.27 μm while a logical value is 0.24 μm (0.238 μm).

However, when a track pitch is narrowed until the track pitch exceeds an optical limit value as described above, a way to appropriately reproduce information which is recorded in each track has to be devised.

It is desirable to enable reproduction of an optical recording medium in which information is recorded at a track pitch which exceeds an optical limit value.

In embodiments of the present technology, a reproducing device employs the following configuration.

Namely, a reproducing device according to an embodiment of the present technology includes a light generation and emission unit that obtains signal light as reflection light, which reflects both of recording signals of a land and a groove, by irradiating an optical recording medium, in which a signal is recorded in both of the land and the groove and a level difference between the land and the groove is set so as to provide a phase difference of approximately 90° to reflection light from the land and reflection light from the groove, with light emitted from a light source, and generates reference light as coherent light by making the light emitted from the light source be reflected by a mirror, so as to emit the signal light and the reference light in a superposed manner.

Further, the reproducing device includes a detection optical system configured to generate a first combination of signal light and reference light, which is obtained by providing a phase difference of approximately 0° to superposed light of the signal light and the reference light, which is emitted by the light generation and emission unit, a second combination of signal light and reference light, which is obtained by providing a phase difference of approximately 180° to the superposed light, a third combination of signal light and reference light, which is obtained by providing a phase difference of approximately 90° to the superposed light, and a fourth combination of signal light and reference light, which is obtained by providing a phase difference of approximately 270° to the superposed light, respectively.

Further, the reproducing device includes a light receiving unit in which the first combination of signal light and reference light, the second combination of signal light and reference light, the third combination of signal light and reference light, and the fourth combination of signal light and reference light are respectively received by a first light receiving element, a second light receiving element, a third light receiving element, and a fourth light receiving element.

Further, the reproducing device includes a reproduction unit configured to reproduce the recording signal of the land and the recording signal of the groove on the basis of a first light receiving signal that is obtained by the first light receiving element, a second light receiving signal that is obtained by the second light receiving element, a third light receiving signal that is obtained by the third light receiving element, and a fourth light receiving signal that is obtained by the fourth light receiving element.

First, signal light which reflects both of recording signals of a land and a groove can be obtained, as described above, as a premise, in the embodiment of the present technology. This represents that a beam spot for reproduction for obtaining the signal light covers both of the land and the groove, namely, this case is accorded with a case where a formation pitch of a land and a groove exceeds an optical limit value.

Further, in the embodiment of the present technology, a level difference between a land and a groove is set so that a phase difference of approximately 90° is provided between reflection light of the land and reflection light of the groove. That is, a phase difference of approximately 90° is provided between a recording signal component of the land and a recording signal component of the groove which are included in the signal light.

Under this premise, a first light receiving signal which is obtained by receiving a first combination of signal light and reference light to which a phase difference of approximately 0° is provided (that is, a phase difference is invariable), a second light receiving signal which is obtained by receiving a second combination of signal light and reference light to which a phase difference of approximately 180° is provided, a third light receiving signal which is obtained by receiving a third combination of signal light and reference light to which a phase difference of approximately 90° is provided, and a fourth light receiving signal which is obtained by receiving a fourth combination of signal light and reference light to which a phase difference of approximately 270° is provided are used for reproduction of the optical recording medium, in the embodiment of the present technology.

Here, regarding a phase difference of signal light and reference light, phase differences of approximately 90° are respectively provided between the first light receiving signal and the third light receiving signal and between the second light receiving signal and the fourth light receiving signal.

Thus, a recording signal component of a land and a recording signal component of a groove to which a phase difference of approximately 90° is provided as described above can be discriminated and read by using the first and third light receiving signals and the second and fourth light receiving signals to which differences of approximately 90° are respectively provided as a phase difference of signal light and reference light.

According to the embodiment of the present technology, an optical recording medium in which information is recorded at a track pitch which exceeds an optical limit value can be reproduced.

Thus, reproduction of information which is recorded at a track pitch which exceeds an optical limit value is enabled, being able to further increase recording capacity.

BRIEF DESCRIPTION OF THE DRAWINGS

FIG. 5 illustrates the configurations of a signal generation system and a servo control system of a reproducing device which is used in the phase diversity method;

FIG. 8 illustrates a tracking servo control technique which is employed in the embodiment;

DETAILED DESCRIPTION OF EMBODIMENTS

Embodiments of the present technology will be described below.

Description is given in the following order.

<1. About homodyne reproducing method of related art>
<2. Embodiment>
[2-1. Optical recording medium which is reproducing object]
[2-2. About tracking servo method for simultaneous reading]
[2-3. Reproducing method of the embodiment]
[2-4. Configuration of reproducing device]
<3. Another embodiment>
<4. Modification>

1. ABOUT HOMODYNE REPRODUCING METHOD OF RELATED ART

A reproducing method of embodiments of the present technology is a reproducing method in which so-called homodyne detection is employed, as described later.

Before provision of description of a reproducing method of the embodiments, a homodyne detection technique of related art is first described. A homodyne detection technique by a so-called phase diversity method is described below as an example.

Figure 1:
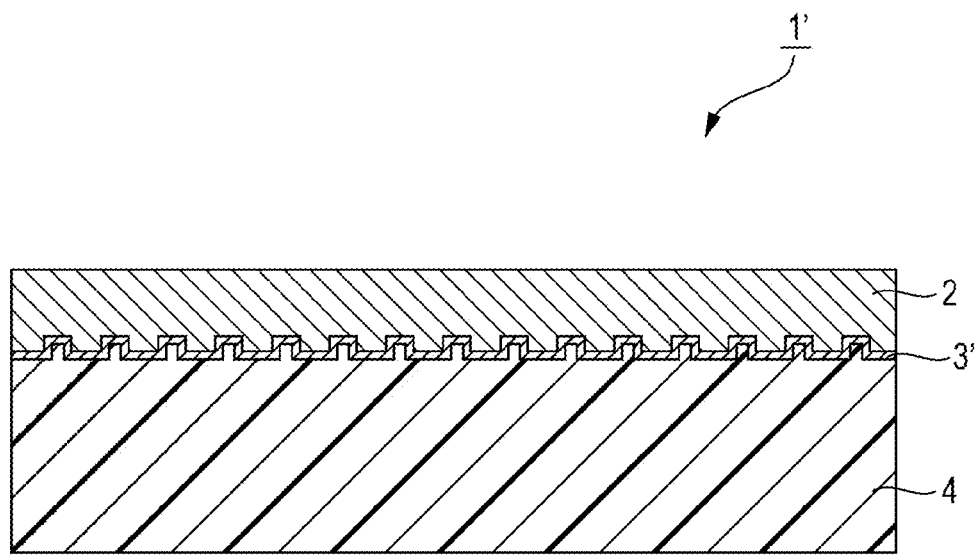
FIG. 1 illustrates the sectional configuration of an optical recording medium which is a reproducing object in a homodyne detection method of related art.

A sectional configuration diagram of an optical recording medium 1' which is a reproducing object is first depicted in FIG. 1.

In FIG. 1, this optical recording medium 1' is a disc-shaped optical recording medium, and the optical recording medium 1' which is rotary-driven is irradiated with laser light so as to reproduce a recording signal. Here, an optical recording medium is a collective term of recording media in which information is reproduced by light irradiation.

The optical recording medium 1' is a so-called ROM-type (read-only type) optical recording medium in which information is recorded by forming a pit (embossed pit).

As depicted in FIG. 1, a cover layer 2, a recording layer (reflection film) 3', and a substrate 4 are formed from an upper layer side in this order.

Here, an "upper layer side" in this specification represents an upper layer side in a case in which a face on which laser light from a reproducing device side is incident is assumed as an upper face. That is, laser light is incident on the optical recording medium 1' from the cover layer 2 side in this case.

In the optical recording medium 1', the substrate 4 is made of resin such as polycarbonate, for example, and a concavo-convex sectional shape associated with formation of pits is provided on the upper face side of the substrate 4 as depicted in FIG. 1.

The substrate 4 on which pits are thus formed is formed by injection molding using a stamper, for example.

Then, a reflection film which is made of metal, for example, is formed on the upper face side of the substrate 4, on which the concave-convex shape is provided, so as to form a recording layer 3'.

Here, a track which is a pit row is formed on the optical recording medium 1' which is a reproducing object in homodyne detection of related art, at a normal track pitch which does not exceed an optical limit value. That is, a track pitch in the recording layer 3' is set to be larger than an optical limit value of which a logical value is expressed by the above-mentioned "λ/NA/2" (λ denotes a reproduction wavelength and NA denotes a numerical aperture of an objective lens).

The cover layer 2 which is formed on the upper layer side of the recording layer 3' is formed such that UV curing resin is applied by spin coating, for example, and then curing processing is performed by UV irradiation.

The cover layer 2 is provided to protect the recording layer 3'.

With respect to such optical recording medium 1', homodyne detection is employed as a method for reforming degradation of a signal-to-noise ratio (SNR) of a detected signal (reproduction signal).

As is widespread in the art, homodyne detection is a technique for amplifying a signal by detecting light which is obtained by making coherent light (DC light) as reference light interfere light (signal light) which is a detecting object.

In the phase diversity method, four combinations of signal light and reference light of which phase differences are mutually different by 90° are used as signal light and reference light.

Specifically, in the phase diversity method, detection is performed for respective combinations of signal light and reference light of which phase differences are respectively adjusted to be 0°, 180°, 90°, and 270°. The detection of these combinations is performed by respectively detecting light intensities of rays of light which are obtained by making signal light and reference light interfere to each other.

Figure 2:
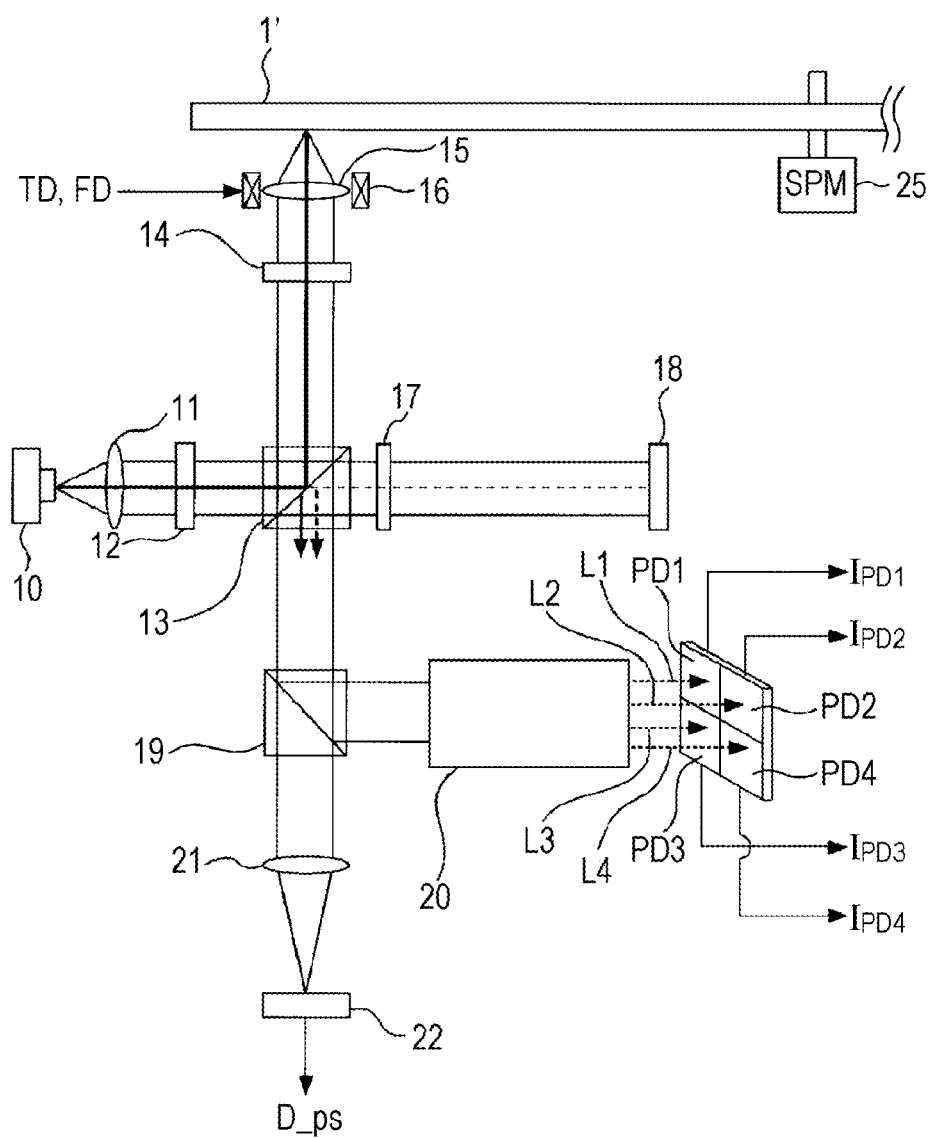
FIG. 2 mainly illustrates the configuration of an optical system which is used in a phase diversity method.

FIG. 2 mainly illustrates the configuration of an optical system which is used in the phase diversity method.

In FIG. 2, when the optical recording medium 1' is loaded on a reproducing device, the optical recording medium 1' is rotary-driven by a spindle motor 25 depicted in FIG. 2.

The optical system in this case is provided with a laser (semiconductor laser) 10 which is a laser light source for reproduction.

Laser light which is emitted from the laser 10 is converted into parallel light via a collimation lens 11 and then enters a polarization beam splitter 13 via a ½ wave plate 12.

In this case, it is assumed that the polarization beam splitter 13 is configured to permit P polarization to pass therethrough and reflect S polarization, for example. In addition, it is assumed that an attachment angle (a rotation angle about an optical axis in an incident face of laser light) of the ½ wave plate 12 is adjusted so that a ratio between light which passes through the polarization beam splitter 13 to be outputted (a P polarization component) and light which is reflected to be outputted (an S polarization component) (that is, a spectral ratio by the polarization beam splitter 13) is approximately 1:1.

The laser light which is reflected by the polarization beam splitter 13 travels through a ¼ wave plate 14 and then is radiated to be condensed on the recording layer 3' of the optical recording medium 1' via an objective lens 15 which is held by a biaxial actuator 16.

The biaxial actuator 16 holds the objective lens 15 in a manner to make the objective lens 15 displaceable in a focus direction (a direction approaching and separating from the optical recording medium 1') and a tracking direction (a direction parallel with a radius direction of the optical recording medium 1': a direction orthogonal to the focus direction).

The biaxial actuator 16 of this case is provided with a focus coil and a tracking coil. When a focus drive signal FD and a tracking drive signal TD, which will be described later, are respectively supplied to the focus coil and the tracking coil, the biaxial actuator 16 displaces the objective lens 15 in the focus direction and the tracking direction respectively.

In reaction to the radiation of the laser light to the recording layer 3', reflection light (signal light) from the recording layer 3' is obtained. The reflection light travels through the objective lens 15 and then through the ¼ wave plate 14 and enters the polarization beam splitter 13 described above.

A polarization direction of the reflection light (return light) incident on the polarization beam splitter 13 is different from a polarization direction of light which is incident from the laser 10 side and reflected by the polarization beam splitter 13 (referred to as outward light) by 90°, due to an action by the ¼ wave plate 14 and an action in reflection in the recording layer 3'. That is, the reflection light is P polarization and is incident on the polarization beam splitter 13.

Therefore, the above-mentioned reflection light serving as the return light passes through the polarization beam splitter 13.

Hereinafter, reflection light which is to thus pass through the polarization beam splitter 13 and reflects a recording signal of the optical recording medium 1' is referred to as signal light.

Further, in FIG. 2, laser light which is emitted by the laser 10 and passes through the polarization beam splitter 13 (P polarization) serves as reference light in the homodyne detection method.

The reference light which has passed through the polarization beam splitter 13 travels through a ¼ wave plate 17 depicted in FIG. 2, then is reflected by a mirror 18, and passes through the ¼ wave plate 17 again. After that, the reference light is incident on the polarization beam splitter 13 as depicted in FIG. 2.

Here, a polarization direction of reference light (return light) which is thus incident on the polarization beam splitter 13 is different from a polarization direction of reference light serving as outward light by 90° (that is, S polarization) due to an action by the ¼ wave plate 17 and an action in reflection by the mirror 18. Accordingly, reference light serving as the return light is reflected by the polarization beam splitter 13.

In FIG. 2, reference light which is thus reflected by the polarization beam splitter 13 is depicted by a dashed arrow.

Further, in FIG. 2, signal light which passes through the polarization beam splitter 13 as described above is depicted by a solid arrow.

As depicted in FIG. 2, these signal light and reference light are emitted in the same direction in a manner to be superposed on each other, depending on the polarization beam splitter 13. Specifically, the signal light and the reference light are emitted in the same direction in a manner that optical axes thereof are superposed on each other, in this case.

Here, the reference light is so-called coherent light.

Superposed light of the signal light and the reference light which is outputted from the polarization beam splitter 13 is incident on a polarization beam splitter 19.

The polarization beam splitter 19 is configured to permit part of P polarization to pass therethrough and reflect approximately 100% of S polarization. Accordingly, a part of signal light passes through the polarization beam splitter 19, another part of the signal light is reflected by the polarization beam splitter 19, and approximately 100% of reference light is reflected by the polarization beam splitter 19.

Here, signal light which has passed through the polarization beam splitter 19 is condensed on a light receiving face of a position control light receiving unit 22 via a condenser lens 21.

The position control light receiving unit 22 serves as a light receiving unit which generates a focus error signal FE and a tracking error signal TE respectively for performing focus servo and tracking servo of the objective lens 15. Here, frequency bands of the focus error signal FE and the tracking error signal TE are substantially lower than that of a reproduction signal (RF signal) for an information signal which is recorded in the optical recording medium 1'. Accordingly, even when a detected light amount is small, degradation of a signal-to-noise ratio (SNR) is suppressed. Therefore, in this example, reflection light from the optical recording medium 1' is lead for detection of an error signal and is independently detected, by the configuration of the optical system described above.

Here, as depicted in FIG. 2, a light receiving signal which is obtained by the position control light receiving unit 22 is denoted as a light receiving signal D_ps.

Further, the signal light and the reference light which are reflected by the polarization beam splitter 19 are incident on a homodyne detection optical system 20.

The homodyne detection optical system 20 generates four combinations of signal light and reference light of which phase differences are mutually different, on the basis of superposed light of the signal light and the reference light which are incident from the polarization beam splitter 19, condenses these combinations on positions which are different from each other, and permits signal light and reference light of each of these combinations to interfere with each other on a corresponding detector (light receiving element).

Specifically, the homodyne detection optical system 20 is configured to generate and condense four combinations of signal light and reference light which are depicted as light beams L1, L2, L3, and L4 in FIG. 2, in this example.

Here, the light beam L1 is obtained by providing a phase difference of 0° (that is, a phase difference is not changed) with respect to superposed light of signal light and reference light which is inputted into the homodyne detection optical system 20. Further, the light beam L2, the light beam L3, and the light beam L4 are obtained by respectively providing a phase difference of 180°, a phase difference of 90°, and a phase difference of 270° with respect to superposed light of signal light and reference light which is inputted into the homodyne detection optical system 20.

As depicted in FIG. 2, the combination of signal light and reference light serving as the light beam L1 (provided with the phase difference of 0°) is lead to a first light detection unit PD1, and the combination of signal light and reference light serving as the light beam L2 (provided with the phase difference of 180°) is lead to a second light detection unit PD2. Further, the combination of signal light and reference light serving as the light beam L3 (provided with the phase difference of 90°) is lead to a third light detection unit PD3, and the combination of signal light and reference light serving as the light beam L4 (provided with the phase difference of 270°) is lead to a fourth light detection unit PD4.

Here, a light receiving signal which is obtained by the first light detection unit PD1 is denoted as a light receiving signal $I_{PD1}$. In a similar manner, a light receiving signal which is obtained by the second light detection unit PD2 is denoted as a light receiving signal $I_{PD2}$, a light receiving signal which is obtained by the third light detection unit PD3 is denoted as a light receiving signal $I_{PD3}$, and a light receiving signal which is obtained by the fourth light detection unit PD4 is denoted as a light receiving signal $I_{PD4}$.

Figure 3:
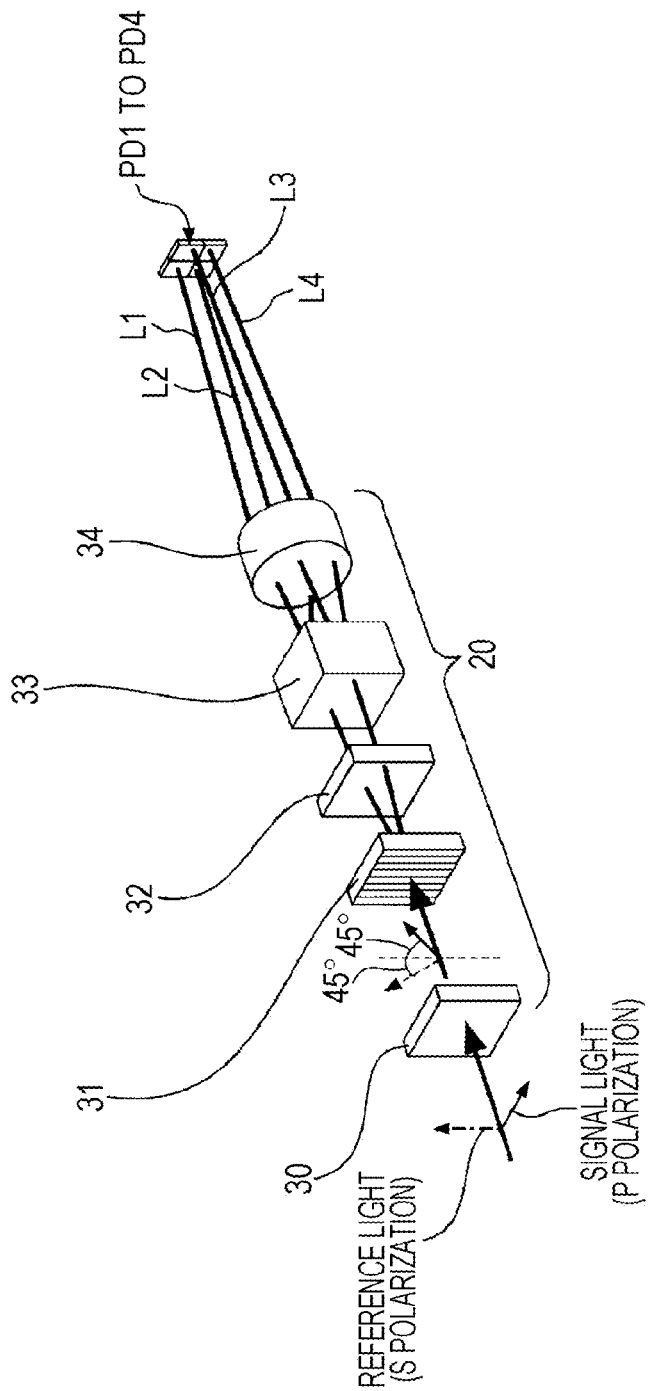
FIG. 3 illustrates a configuration example of a homodyne detection optical system.

FIG. 3 illustrates a specific configuration example of the homodyne detection optical system 20.

Here, FIG. 3 illustrates the first to fourth light detection units PD1 to PD4 which are depicted in FIG. 2, in addition to the configuration of the homodyne detection optical system 20.

The homodyne detection optical system 20 depicted in FIG. 3 has approximately the same configuration as that of the homodyne detection optical system which is disclosed in Japanese Unexamined Patent Application Publication No. 2008-269680 which is mentioned above (a polarization phase conversion separation element 114 and a condenser lens 115: refer to FIGS. 1 and 2 of Japanese Unexamined Patent Application Publication No. 2008-269680).

As depicted in FIG. 3, the homodyne detection optical system 20 includes a ½ wave plate 30, a non-polarized diffraction grating 31, an angle selectivity phase difference plate 32, a Wollaston prism 33, and a condenser lens 34.

As understood from the above description referring to FIG. 2, superposed light of signal light and reference light which are emitted from the polarization beam splitter 19 is incident on the homodyne detection optical system 20. Further, the signal light and the reference light which are thus incident on the homodyne detection optical system 20 are converted into parallel light and polarization directions of respective light are orthogonal to each other (the signal light is P polarization and the reference light is S polarization in this example).

On the ½ wave plate 30, signal light and reference light having such relation that polarization directions thereof are orthogonal to each other as mentioned above are incident. Polarization directions of signal light and reference light are rotated by 45 degrees as depicted in FIG. 3 by adjusting an attachment angle (a rotation angle about an optical axis in an incident face of laser light) of the ½ wave plate 30.

The non-polarized diffraction grating 31 divides superposed light of signal light and reference light which has traveled through the ½ wave plate 30 to be parallel light and outputs two light beams of which traveling directions are different from each other. One light beam is 0-th order light which travels straight and the other light beam is 1-st order light which is diffracted by a predetermined diffraction angle, in this example.

The above-mentioned two light beams which are obtained through the division by the non-polarized diffraction grating 31 are incident on the angle selectivity phase difference plate 32.

The angle selectivity phase difference plate 32 is made of uniaxial anisotropy crystal having birefringence such as crystal, and a direction of an optical axis of the crystal is set in a direction which is tilted by a predetermined angle with respect to an optical axis of the above-mentioned 0-th order light. Accordingly, a phase difference of 90° is provided to the signal light and the reference light of the above-mentioned 0-th order light which travels straight, while a phase difference is not provided to the signal light and the reference light of the above-mentioned 1-st order light (a phase difference does not change).

The above-mentioned 0-th order light and the above-mentioned 1-st order light which have traveled through the angle selectivity phase difference plate 32 are incident on the Wollaston prism 33.

The Wollaston prism 33 divides the above-mentioned 0-th order light (a phase difference of 90° is provided) and the above-mentioned 1-st order light (a phase difference of 0° is provided) respectively so as to generate four light beams in total. That is, the Wollaston prism 33 generates a light beam composed of a combination of signal light and reference light to which the phase difference of 0° is provided (L1) and a light beam composed of a combination of signal light and reference light to which the phase difference of 180° is provided (L2), on the basis of the above-mentioned 1-st order light. Further, the Wollaston prism 33 generates a light beam composed of a combination of signal light and reference light to which the phase difference of 90° is provided (L3) and a light beam composed of a combination of signal light and reference light to which the phase difference of 270° is provided (L4), on the basis of the above-mentioned 0-th order light.

Here, a principle that respective light beams to which phase differences of 0°, 90°, 180°, and 270° are provided from the Wollaston prism 33 are obtained in the above-described configuration is same as the principle which is described in Japanese Unexamined Patent Application Publication No. 2009-15944 (refer to description of [0015] and FIG. 3).

Here, a spectral direction by the Wollaston prism 33 is orthogonal to a spectral direction by the non-polarized diffraction grating 31.

Figure 4A:
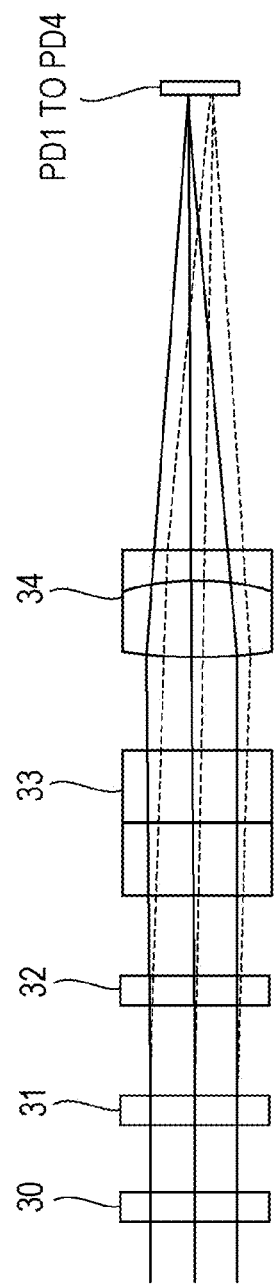
FIGS. 4A and 4B illustrate spectral directions by a non-polarized diffraction grating and Wollaston prism.
Figure 4B:
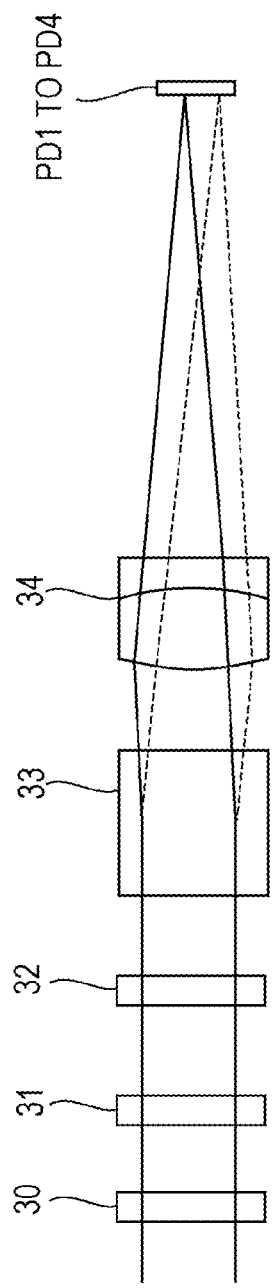

FIGS. 4A and 4B illustrate this point. FIG. 4A is a sectional view illustrating the homodyne detection optical system 20 in a case in which a face parallel with a spectral direction by the non-polarized diffraction grating 31 is set as a section, and FIG. 4B is a sectional view illustrating the homodyne detection optical system 20 in a case in which a face orthogonal to the face parallel with the spectral direction by the non-polarized diffraction grating 31 is set as a section.

The description goes back to FIG. 3.

The above-mentioned four light beams which are respectively obtained by the Wollaston prism 33 pass through the condenser lens 34 to be respectively condensed on light receiving elements (later-described photodiodes) each of which is formed on one corresponding light detection unit PD among the first to fourth light detection units PD1 to PD4.

Here, the configuration of a homodyne detection optical system is not to be limited to the configuration of the homodyne detection optical system 20 which is described above.

For example, the optical system uses 0-th order light obtained by the non-polarized diffraction grating 31 in the above description. However, an optical system may be designed such that a non-polarized diffraction grating which is configured to quench the 0-th order light is used and light beams L1 to L4 are generated by using ±1-st order light.

Further, the angle selectivity phase difference plate which has a crystalline optical axis which is tilted to an optical axis is used in the above description. However, such configuration may be employed that a phase difference is provided by an angle selectivity phase difference plate which has a crystalline optical axis which is parallel with an optical axis.

FIG. 5 illustrates the configurations of a signal generation system and a servo control system which are provided to a reproducing device which is used in a phase diversity method.

A reproducing device of this case includes a signal generation circuit 35 and a servo circuit 36 as configurations for performing servo control of the biaxial actuator 16 (the objective lens 15) on the basis of a light receiving signal D_ps obtained by the position control light receiving unit 22.

The reproducing device further includes a reproduction signal generation unit 37 which generates a RF signal as a signal which is obtained by reproducing a signal, which is recorded in the optical recording medium 1', on the basis of a light receiving signal $I_{PD1}$ obtained by the first light detection unit PD1, a light receiving signal $I_{PD2}$ obtained by the second light detection unit PD2, a light receiving signal $I_{PD3}$ obtained by the third light detection unit PD3, and a light receiving signal $I_{PD4}$ obtained by the fourth light detection unit PD4.

The signal generation circuit 35 generates a focus error signal FE and a tracking error signal TE on the basis of the light receiving signal D_ps from the position detection light receiving unit 22.

Further, the servo circuit 36 generates a focus servo signal and a tracking servo signal respectively on the basis of the focus error signal FE and the tracking error signal TE which are generated in the signal generation circuit 35. Then, the focus coil and the tracking coil of the biaxial actuator 16 which is depicted in FIG. 2 above are respectively driven by the focus drive signal FD and the tracking drive signal TD which are generated from the focus servo signal and the tracking error signal respectively.

Accordingly, a focus servo loop and a tracking servo loop of the objective lens 15 are formed, realizing focus servo control and tracking servo control.

The reproduction signal generation unit 37 performs calculation as the phase diversity method on the basis of the light receiving signals $I_{PD1}$, $I_{PD2}$, $I_{PD3}$, and $I_{PD4}$ so as to reproduce a signal which is recorded in the optical recording medium 1'. Specifically, the reproduction signal generation unit 37 calculates a difference value $I_{calc1}$ between the light receiving signal $I_{PD2}$ and the light receiving signal $I_{PD2}$ and a difference value $I_{calc2}$ between the light receiving signal $I_{PD3}$ and the light receiving signal $I_{PD4}$ and outputs a square root of a sum of squares of these difference values $I_{calc1}$ and $I_{calc2}$ as a value of a RF signal.

Here, the phase diversity method is described by using formulas.

Here, in formulas below, an electric field of signal light which is emitted by the polarization beam splitter 13 is expressed as $\frac{1}{2}|E_{sig}|$ and an electric field of reference light is expressed as $\frac{1}{2}|E_{ref}|$ for the sake of simplicity of description.

Further, in the following formula, "$\phi_{sig}-\phi_{ref}$" represents a phase difference between signal light and reference light which is caused by surface wobbling of the optical recording medium 1' (a phase difference between signal light and reference light which is generated due to driving of the objective lens 15 along with surface wobbling by focus servo control), and i denotes an imaginary number.

First, the light receiving signals $I_{PD1}$, $I_{PD2}$, $I_{PD3}$, and $I_{PD4}$ are respectively expressed by Formula 1 to Formula 4 below.

$$I_{PD1} = \left|\frac{1}{2}E_{sig} + \frac{1}{2}E_{ref}\right|^2 \quad \text{[Formula 1]}$$
$$= \frac{1}{4}|E_{sig}|^2 + \frac{1}{4}|E_{ref}|^2 + \frac{1}{2}|E_{sig}||E_{ref}|\cos(\phi_{sig}-\phi_{ref})$$

$$I_{PD2} = \left|\frac{1}{2}E_{sig} - \frac{1}{2}E_{ref}\right|^2 \quad \text{[Formula 2]}$$
$$= \frac{1}{4}|E_{sig}|^2 + \frac{1}{4}|E_{ref}|^2 - \frac{1}{2}|E_{sig}||E_{ref}|\cos(\phi_{sig}-\phi_{ref})$$

$$I_{PD3} = \left|\frac{1-i}{\sqrt{2}}\frac{E_{sig}}{2} + \frac{1+i}{\sqrt{2}}\frac{E_{ref}}{2}\right|^2 \quad \text{[Formula 3]}$$
$$= \frac{1}{4}|E_{sig}|^2 + \frac{1}{4}|E_{ref}|^2 + \frac{1}{2}|E_{sig}||E_{ref}|\sin(\phi_{sig}-\phi_{ref})$$

$$I_{PD4} = \left|\frac{1+i}{\sqrt{2}}\frac{E_{sig}}{2} + \frac{1-i}{\sqrt{2}}\frac{E_{ref}}{2}\right|^2 \quad \text{[Formula 4]}$$
$$= \frac{1}{4}|E_{sig}|^2 + \frac{1}{4}|E_{ref}|^2 - \frac{1}{2}|E_{sig}||E_{ref}|\sin(\phi_{sig}-\phi_{ref})$$

Further, the difference value $I_{calc1}$ between the light receiving signal $I_{PD1}$ and the light receiving signal $I_{PD2}$ and the difference value $I_{calc2}$ between the light receiving signal $I_{PD3}$ and the light receiving signal $I_{PD4}$ are respectively expressed by Formula 5 and Formula 6 below.

$$I_{PD1}-I_{PD2}=I_{calc1}=|E_{sig}||E_{ref}|\cos(\phi_{sig}-\phi_{ref})$$ [Formula 5]

$$I_{PD3}-I_{PD4}=I_{calc2}=|E_{sig}||E_{ref}|\sin(\phi_{sig}-\phi_{ref})$$ [Formula 6]

A square root of a sum of squares of the difference value $I_{calc1}$ and the difference value $I_{calc2}$ is calculated in the phase diversity method as mentioned above and a result thereof is expressed as Formula 7 below.

$$\sqrt{I^2_{calc1}+I^2_{calc2}}=|E_{sig}||E_{ref}|$$ [Formula 7]

From this Formula 7, it is understood that a reproduction result which is obtained by amplifying a component of signal light by a component of reference light is obtained. That is, a recording signal of the optical recording medium 1' is amplified to be detected, realizing improvement of a SNR in this point.

Further, so-called differential detection (specifically, $I_{PD1}-I_{PD2}$, $I_{PD3}-I_{PD4}$) is performed in the above example. This differential detection enables cancellation of a noise component other than signal light components. That is, an effect of improvement of a SNR is obtained in this point, as well.

Further, according to the phase diversity method, a recording signal can be properly reproduced even when surface wobbling occurs (even in a case where a phase difference between signal light and reference light changes along with surface wobbling), as understood in terms of disappearance of a component of the phase difference $\phi_{sig}-\phi_{ref}$ in Formula 7.

Here, such method that position control of the mirror 18 is performed to cancel a phase difference between signal light and reference light which is caused by surface wobbling may be employed as a homodyne detection method. However, according to the phase diversity method, such configuration for position control of the mirror 18 can be omitted.

2. EMBODIMENT

2-1. Optical Recording Medium which is Reproducing Object

Figure 6A:
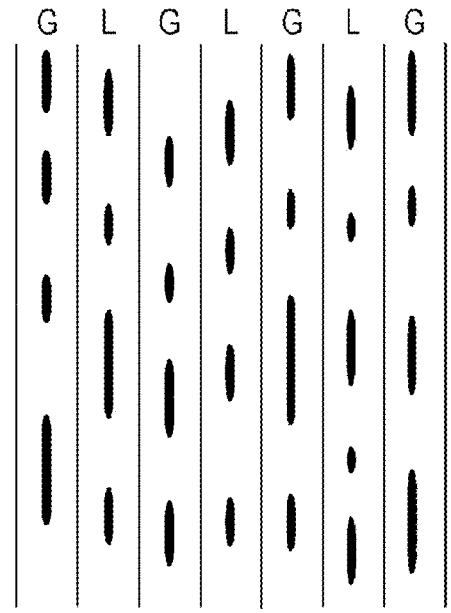
FIGS. 6A and 6B illustrate the configurations of recording surfaces of the optical recording medium which is a reproducing object in an embodiment.
Figure 6B:
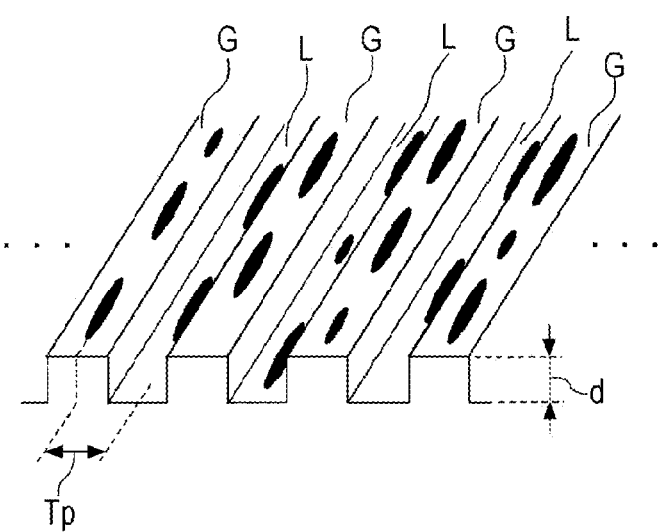

FIGS. 6A and 6B illustrate the configuration of a recording surface of an optical recording medium 1 which is a reproducing object in an embodiment.

FIG. 6A is a plan view illustrating an enlarged part of a recording surface, and FIG. 6B is a perspective view illustrating an enlarged part of a recording surface. FIG. 6B illustrates a face on a side which is irradiated with laser light for reproduction. That is, laser light for reproduction is radiated from the upper side of the plane of the diagram.

Apparent from FIGS. 6A and 6B, grooves G and lands L are formed on the optical recording medium 1 which is a reproducing object in the embodiment.

In this specification, a side which laser light for reproduction first reaches, that is, a convex side is referred to as a groove G and a concave side is referred to as a land L, in a similar manner to the case of a Blu-ray Disc® (BD).

In the optical recording medium 1 which is a reproducing object in the embodiment, pit rows are formed on both of the grooves G and the lands L as depicted in FIGS. 6A and 6B.

Here, when a pit row is assumed as a track, a track pitch Tp of this case can be defined as a formation pitch of a land L and a groove G as depicted in FIG. 6B.

In the optical recording medium 1 of the embodiment, such track pitch Tp is set as a narrow pitch which exceeds an optical limit value, so as to realize improvement of information recording density.

For example, in a case where a formation pitch of grooves G in the optical recording medium 1 is same as a track pitch in the optical recording medium 1' of related art (formation pitch of pit rows), information recording density of the optical recording medium 1 is enhanced to be approximately twice as high as that of the related art.

Further, in the optical recording medium 1 of the embodiment, a value of a level difference d between a land L and a groove G is set so that a phase difference of 90° is provided between reflection light of the land L and reflection light of the groove G.

In other words, when a refractive index of the optical recording medium 1 is denoted as n, a level difference d is set as "$\lambda/8/n$".

In a condition of a reproduction wavelength $\lambda=405$ nm and n=1.5, for example, a level difference d of approximately 33 nm is set.

2-2. About Tracking Servo Method for Simultaneous Reading

In a reproducing method of the embodiment, a signal which is recorded at a narrow pitch which exceeds an optical limit value as described above is reproduced, by using a homodyne detection method.

Figure 7:
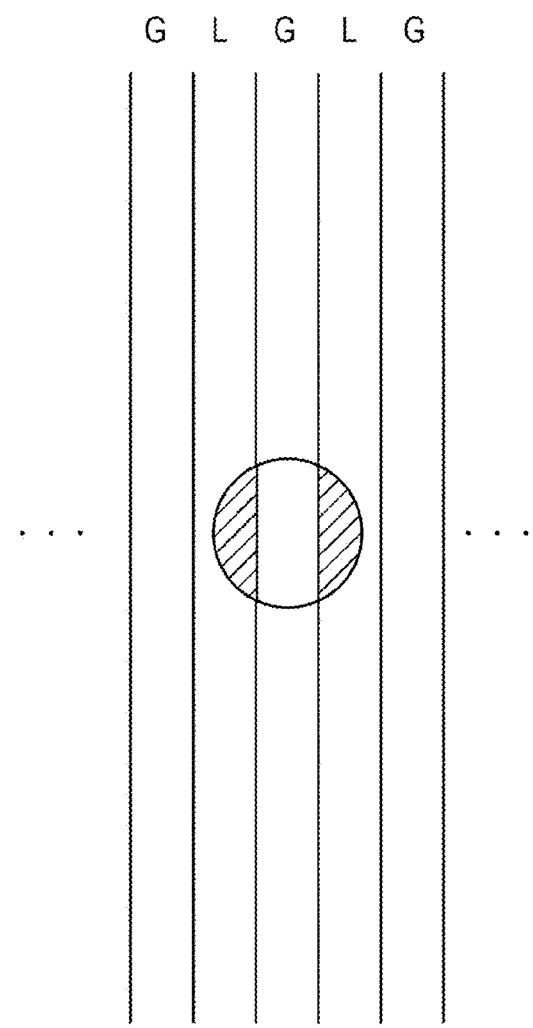
FIG. 7 illustrates a relationship among a beam spot of reproduction light which is formed on a recording surface, lands, and grooves.

Here, a formation pitch between a land L and a groove G exceeds an optical limit value in the optical recording medium 1 of the embodiment, thereby providing a relation among a beam spot of reproduction light which is formed on a recording surface, lands L, and grooves G as depicted in FIG. 7, for example.

In this case, it is assumed that tracking servo control of the objective lens 15 is performed with respect to the groves G or the lands L in a similar manner to related art. FIG. 7 illustrates a case where tracking servo control of the objective lens 15 is performed with respect to the grooves G.

In this case, regarding information which is recorded in lands L, it is found that pieces of recording information of two lands L which are adjacent to a groove G which is a servo object are mixed. Consequently, even if it is possible to discriminate and read information of lands L and information of grooves G, it is hard to properly reproduce a recording signal on the lands L side.

Needless to say, similar mixing also occurs for recording information on the grooves G side in a case where tracking servo is performed with respect to the lands L.

Therefore, in the embodiment, the following tracking servo control technique is employed so as to realize suppression of mixing of pieces of information among lands L and among grooves G and enable simultaneous reading of recording information on the land L side and recording information on the groove G side.

FIG. 8 illustrates a tracking servo control technique which is employed in the embodiment.

As depicted in FIG. 8, at least two beam spots which are a reproduction spot for information reproduction and a first side spot or a second side spot are formed in the embodiment.

In this case, a spot interval between a reproduction spot and a first side spot or a second side spot in a tracking direction is set as ½ Tp as depicted in FIG. 8.

Here, a side spot is formed by using grating in this embodiment as also described later. Therefore, beam spots which are formed in this example are three spots in total which are a reproduction spot, a first side spot, and a second side spot, as depicted in FIG. 8. The reproduction spot is 0-th order light, the first side spot is +1-st order light, and the second side spot is −1-st order light.

In such condition that the first side spot or the second side spot described above is formed, tracking servo control of the objective lens 15 is performed on the basis of reflection light of the first side spot or the second side spot in the embodiment. That is, tracking servo control in which the first side spot is permitted to trace a center of a land L or a groove G or tracking servo control in which the second side spot is permitted to trace a center of a land L or a groove G is performed.

By performing such tracking servo control, a reproduction spot can be permitted to trace an intermediate position (border position) between a land L and a groove G. Accordingly, mixing of pieces of recording information among lands L or among grooves G, which is depicted in FIG. 7, can be effectively suppressed. As a result, recording information of a land L and recording information of a groove G can be simultaneously read out by a reproducing method of the embodiment described later.

For confirmation, in a case where the above-described tracking servo control technique is employed, a component of reflection light (signal light) of a combination of a land L and a groove G which are adjacent to each other is included in a light receiving signal ($I_{PD1}$, $I_{PD2}$, $I_{PD3}$, and $I_{PD4}$) which is obtained by receiving reflection light of a reproduction spot.

2-3. Reproducing Method of the Embodiment

In the light of the above-mentioned premise, a reproducing method of the embodiment is described below.

The embodiment and another embodiment which are described below are a method for discriminating and reading signals which are recorded in a land L and a groove G by using light receiving signals $I_{PD1}$, $I_{PD2}$, $I_{PD3}$, and $I_{PD4}$ in a similar manner to the phase diversity method of related art.

Specifically, signals which are recorded in a groove G and a land L are discriminated and read by using a differential detection result which is a difference value $I_{calc1}$ between the light receiving signal $I_{PD1}$ and the light receiving signal $I_{PD}$ and a differential detection result which is a difference value $I_{calc2}$ between the light receiving signal $I_{PD3}$ and the light receiving signal $I_{PD4}$ in the embodiment.

In this example, a reproduction spot covers both of a land L and a groove G, as illustrated in FIG. 8 above. As understood from this, as well, a light receiving signal includes a signal light component which reflects a recording signal of a groove G (referred to below as a groove signal component SG) and a signal light component which reflects a recording signal of a land L (referred to below as a land signal component SL), as components of the signal light, in this example. In other words, a light receiving signal of this example corresponds to a composite component, which is detected, of the groove signal component SG and the land signal component SL.

Hereinafter, a composite component of the groove signal component SG and the land signal component SL which is thus detected is denoted as a composite component M.

Figure 12:
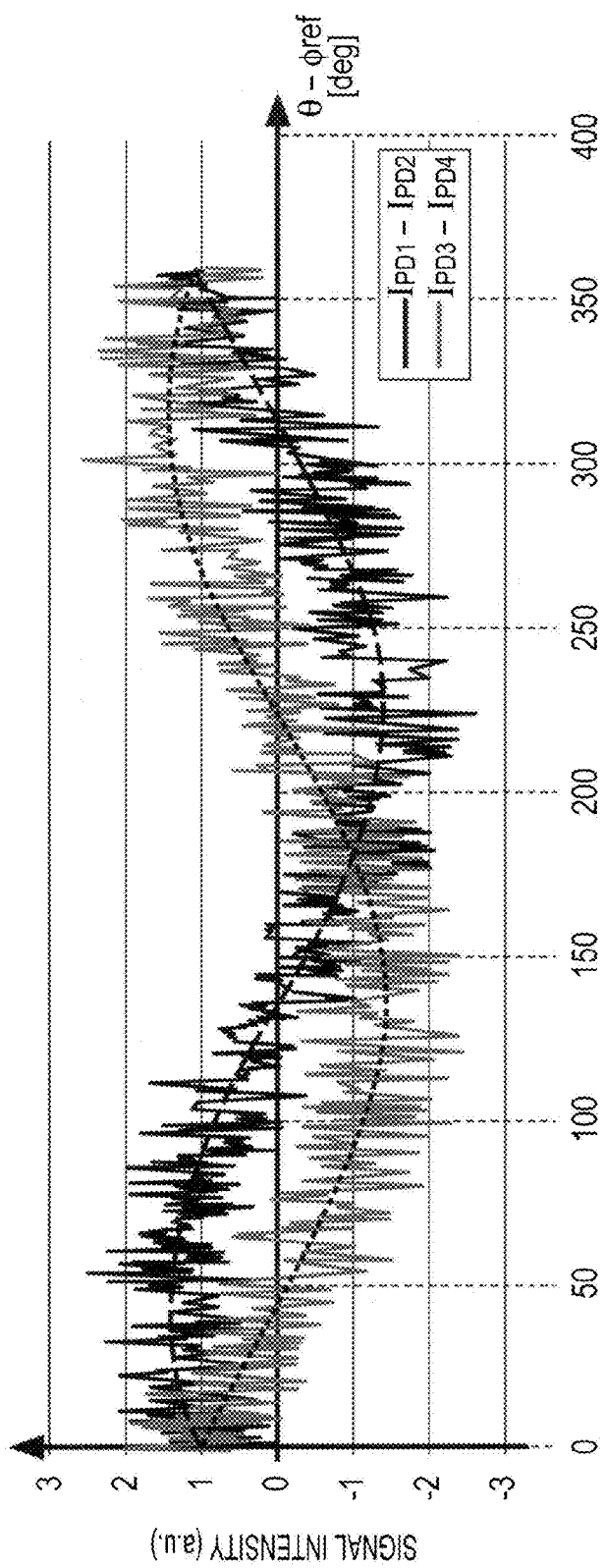
FIG. 12 illustrates waveforms of a difference value ($I_{PD1}-I_{PD2}$) and a difference value ($I_{PD3}-I_{PD4}$) of a case in which surface wobbling occurs.

Here, it is assumed that an optical path length of reference light is set so that a phase difference of reference light with respect to signal light from a groove G (a phase difference on a stage of output of multiplexed light of signal light and reference light: a phase difference on a stage of output of a polarization beam splitter 45 which is depicted in FIG. 12 described later in the embodiment) is 0° in an ideal state in which there is no surface wobbling of the optical recording medium 1, in this example.

In other words, a phase difference between signal light of a land L and reference light (a phase difference on a stage of output of multiplexed light of signal light and reference light) is 90° in an ideal state with no surface wobbling, in this example.

Figure 9A:
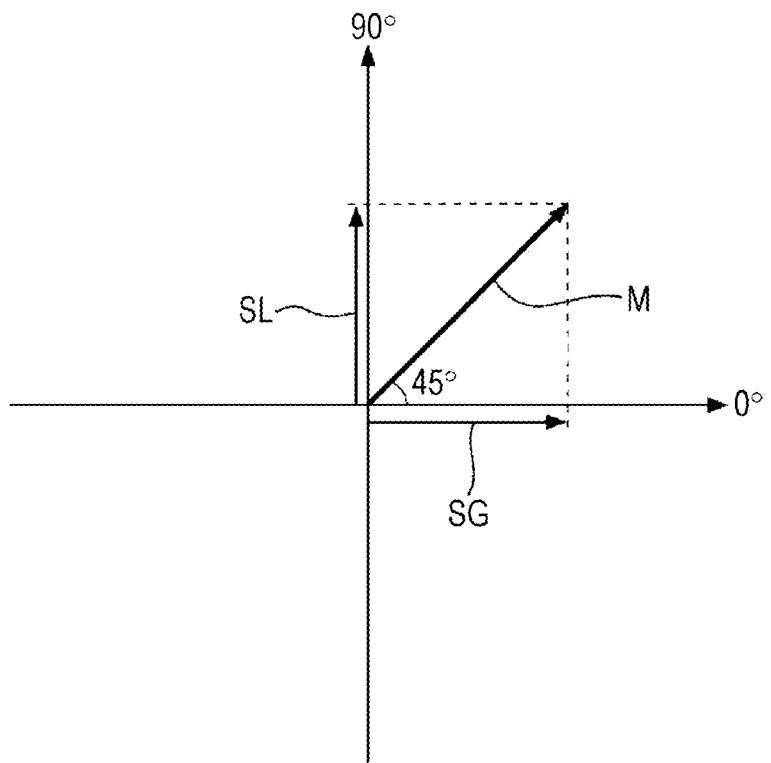
FIGS. 9A and 9B illustrate a relationship among 0° detection ch, 90° detection ch, a land signal component, a groove signal component, and a composite component in an orthogonal phase space.

FIG. 9A illustrates a relation of respective electric field vectors of a land signal component SL, a groove signal component SG, and a composite component M in an orthogonal phase space in an ideal state with no surface wobbling.

Here, description is provided below on the assumption that a difference between a reflection light amount from a land L and a reflection light amount from a groove G is 0.

In FIG. 9A, an axis of 0° of the diagram corresponds to a detection channel (ch) for a combination of signal light and reference light in a phase difference of 0°.

In this example, differential detection which uses a light receiving signal $I_{PD2}$ of a combination of signal light and reference light of a phase difference of 0° and a light receiving signal $I_{PD2}$ of a combination of signal light and reference light of a phase difference of 180° is performed, that is, a difference value $I_{calc1}$ is calculated. Here, it can be considered that a detection ch of the difference value $I_{calc1}$ is accorded with the axis of 0°.

Further, an axis of 90° in FIG. 9A corresponds to a detection ch of a combination of signal light and reference light in a phase difference of 90°. It can be also considered that the axis of 90° is accorded with a detection ch of a difference value $I_{calc2}$ which is a value of a result of differential detection using a light receiving signal $I_{PD3}$ of a combination of signal light and reference light of a phase difference of 90° and a light receiving signal $I_{PD4}$ of a combination of signal light and reference light of a phase difference of 270°.

In this example, an optical path length of reference light is set so that a phase difference between signal light of a groove G and reference light is 0° in an ideal state with no surface wobbling, as described above. Further, due to the configuration depicted in FIG. 6B, a phase difference of 90° is generated between signal light of a groove G and signal light of a land L.

According to these points, a direction of a vector of the groove signal component SG is accorded with a 0° detection ch and a direction of a vector of the land signal component SL is accorded with a 90° detection ch, in the ideal state with no surface wobbling, as depicted in FIG. 9A.

Further, a vector of the composite component M is in a direction of 45° which is an intermediate angle of angles of respective vectors of the signal component SG and the signal component SL, in the ideal state with no surface wobbling.

Here, a modulation component (high frequency component) corresponding to a recording signal ("0", "1") is included in each of the signal components SG and SL. Directions of respective vectors of these signal components SG and SL change in accordance with the modulation component in practice. However, it is assumed that directions of respective vectors of these signal components SG and SL represent directions in a case in which a high frequency component as the modulation component is eliminated, for the sake of simplicity of description. In a similar manner, regarding a direction of a vector of the composite component M, as well, the above-mentioned modulation component is eliminated.

In each detection ch, a projected component of the composite component M is detected.

As depicted in FIG. 9A, a projected component of the composite component M is accorded with the groove signal component SG in the 0° detection ch. As understood from this point as well, only a groove signal component SG can be reproduced by calculating a difference value $I_{calc1}$ in the ideal state with no surface wobbling.

On the other hand, a projected component of the composite component M is accorded with the land signal component SL in the 90° detection ch. That is, only a land signal component SL can be reproduced by calculating a difference value $I_{calc2}$ in the ideal state with no surface wobbling.

Figure 10:
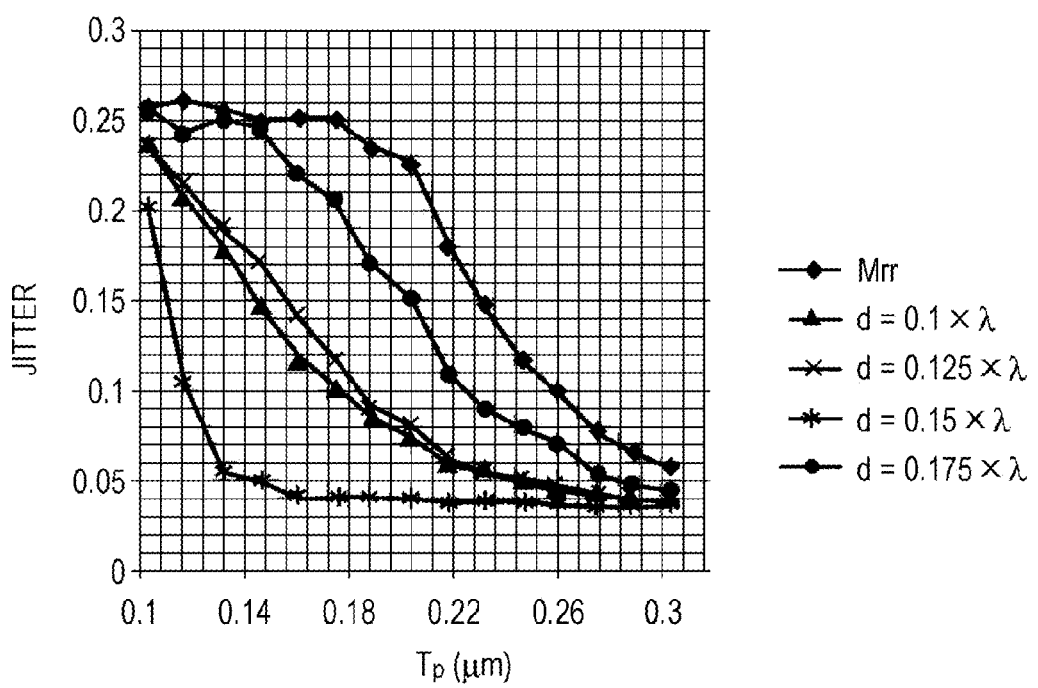
FIG. 10 illustrates a result, which is obtained by simulation, of a relationship between a track pitch and a jitter value when level differences between lands and grooves are set to mutually have different values.

FIG. 10 illustrates a result, which was obtained by simulation, of a relation between a track pitch Tp and a jitter value when level differences d between lands L and grooves G were set to mutually have different values.

Specifically, FIG. 10 illustrates a result which was obtained such that a reproduction signal was obtained on the basis of a difference value $I_{calc1}$ and a jitter value of the reproduction signal was calculated in an ideal condition with no surface wobbling.

Mrr (mirror) in FIG. 10 represents d=0. Here, calculation was performed in the condition that a refractive index n of the optical recording medium 1 was 1 in the simulation of FIG. 10.

Further, optical conditions of λ=405 nm and NA=0.85 were set in the simulation.

From this simulation result of FIG. 10, it is found that a jitter value of the reproduction signal based on the difference value $I_{calc1}$ (that is, a reproduction signal of a recording signal of a groove G in this example) is hardly changed, by setting a level difference d so that a phase difference of 90° is provided to reflection light of a land L and reflection light of a groove G as the embodiment, between a case in which a signal is recorded at a pitch which exceeds an optical limit value (approximately 0.27 μm in this case) and a case in which a signal is recorded at a pitch which does not exceed an optical limit value. Specifically, a jitter value hardly changes up to a track pitch Tp of approximately 0.13 μm.

As understood from this as well, according to the embodiment, it is found that a recording signal component of a groove G can be extracted by calculation of a difference value $I_{calc1}$ in an ideal state with no surface wobbling, from the optical recording medium 1 in which recording is performed at a pitch which exceeds an optical limit value.

Here, FIG. 10 illustrates a result of calculation of a jitter value of a reproduction signal based on the difference value $I_{calc1}$, but a result of calculation of a jitter value of a reproduction signal based on the difference value $I_{calc2}$ (that is, a reproduction signal of a recording signal of a land L) becomes similar to the result depicted in FIG. 10. Namely, according to the embodiment, a recording signal component of a land L can be extracted from the optical recording medium 1 in which recording is performed at a pitch which exceeds an optical limit value, by calculation of a difference value $I_{calc2}$, in an ideal state with no surface wobbling.

However, it is very hard to manufacture an ideal optical recording medium 1 in which no surface wobbling occurs, in an actual state.

Accordingly, a method by which a recording signal of a groove G and a recording signal of a land L can be properly discriminated and read even in a case in which surface wobbling occurs is proposed in the embodiment.

When surface wobbling occurs and a phase difference between signal light and reference light changes, a relation among a 0° detection ch, a 90° detection ch, a groove signal component SG, a land signal component SL, and a composite component M changes in an orthogonal phase space.

Figure 9B:
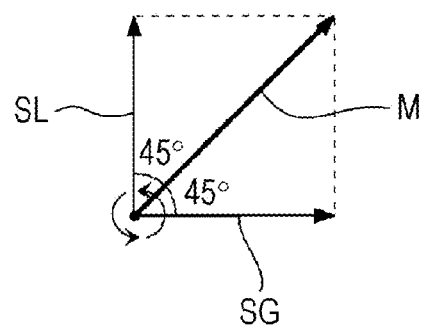

Specifically, respective vectors of the groove signal component SG, the land signal component SL, and the composite component M rotate about an origin (0,0) in the orthogonal phase space as depicted in FIG. 9B, in response to change of a phase difference between signal light and reference light caused by surface wobbling.

At this time, a relative relation of respective vectors of the groove signal component SG and the land signal component SL becomes invariable from a state with no surface wobbling depicted in FIG. 9A. Specifically, vectors of the groove signal component SG and the land signal component SL maintain an orthogonal relation depicted in FIG. 9A. This is because a phase difference between reflection light from a groove G and reflection light from a land L is 90° which is invariable even when a phase difference between signal light and reference light is changed due to surface wobbling.

Thus, vectors of the groove signal component SG and the land signal component SL maintain an orthogonal relation. Therefore, a vector of the composite component M rotates while maintaining an angular difference of 45° with respect to respective vectors of the groove signal component SG and the land signal component SL, in a similar manner to the case with no surface wobbling.

Figure 11A:
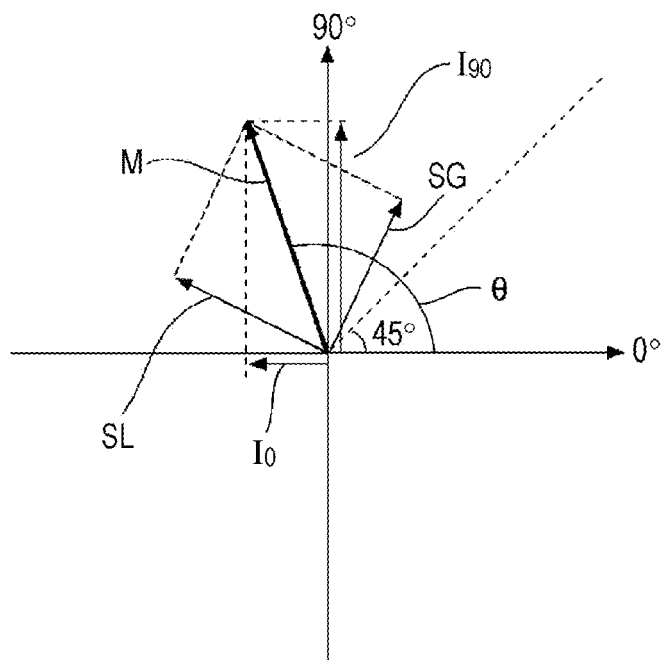
FIGS. 11A and 11B illustrate a reproducing method of the embodiment.

FIG. 11A represents a state of a case in which the vector of the composite component M is in a direction of θ° other than 45° along with surface wobbling, in an orthogonal phase space.

When the vector of the composite component M is in a predetermined direction of θ° other than 45° as depicted in FIG. 11A, a direction of the vector of the groove signal component SG which is to be detected is in a direction of θ−45° and a direction of the vector of the land signal component SL is in a direction of θ+45° as depicted by a gray color in FIG. 11A.

On the other hand, a signal which is actually detected in the 0° detection ch in this case is denoted as a detected signal $I_0$ which is depicted in FIG. 11A and is obtained by projecting the composite component M on the axis of 0°, and a signal which is detected in the 90° detection ch is denoted as a detected signal $I_{90}$ which is depicted in FIG. 11A and is obtained by projecting the composite component M on the axis of 90°.

As understood from these points as well, when a phase difference between signal light and reference light occurs due to surface wobbling, it is difficult to properly extract respective recording signal components of a land L and a groove G only by merely calculating a difference value $I_{calc1}$ and a difference value $I_{calc2}$.

Figure 11B:
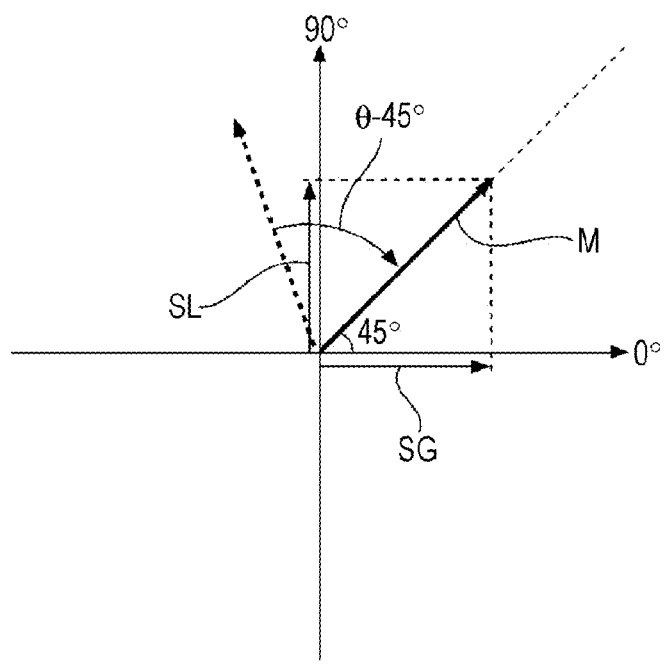

Therefore, in the embodiment, a direction of the vector of the composite component M is rotated by θ−45° so as to set the direction of the vector of the composite component M in a 45° direction which is same as the ideal state having no surface wobbling, as depicted in FIG. 11B.

This represents that when synthetic light of signal light of a groove G and signal light of a land L is represented as synthetic signal light, a phase difference between the synthetic signal light and reference light (a phase difference on a stage of output of multiplexed light of signal light and reference light) becomes 0°, namely, this corresponds to cancellation of the phase difference.

By setting the direction of the vector of the composite component M in the 45° direction as mentioned above, the vector of the groove signal component SG is accorded with the axis of 0°, as is the case with the ideal state depicted in FIG. 9A and the vector of the land signal component SL is also accorded with the axis of 90° as is the case with the ideal state depicted in FIG. 9A, as depicted in FIG. 11B.

Thus, a recording signal of a groove G and a recording signal of a land L can be properly discriminated and read.

In the embodiment, an action in which a vector of a composite component M is rotated by θ−45° as described above, in other words, an action in which a phase difference between synthetic signal light of a land L and a groove G and reference light is cancelled is realized by calculation.

Before provision of specific description of a calculation method, light receiving signals $I_{PD1}$, $I_{PD2}$, $I_{PD3}$, and $I_{PD4}$ which are obtained in the embodiment are expressed by Formula 8 to Formula 11 below respectively.

Here, in the following formulas, $|E_G|$ denotes electric field intensity of reflection light from a groove G and $|E_L|$ denotes electric field intensity of reflection light from a land L respectively.

Further, as understood from the above description as well, "θ−45°" in the following formulas denotes a component of a phase difference between synthetic signal light of a land L and a groove G and reference light.

$$I_{PD1} = \tfrac{1}{4}|E_{sig}|^2 + \tfrac{1}{4}|E_{ref}|^2 + \tfrac{1}{2}|E_G||E_{ref}|\cos(\theta-45°) - \tfrac{1}{2}|E_L||E_{ref}|\sin(\theta-45°) \quad \text{[Formula 8]}$$

$$I_{PD2} = \tfrac{1}{4}|E_{sig}|^2 + \tfrac{1}{4}|E_{ref}|^2 - \tfrac{1}{2}|E_G||E_{ref}|\cos(\theta-45°) + \tfrac{1}{2}|E_L||E_{ref}|\sin(\theta-45°) \quad \text{[Formula 9]}$$

$$I_{PD3} = \tfrac{1}{4}|E_{sig}|^2 + \tfrac{1}{4}|E_{ref}|^2 - \tfrac{1}{2}|E_G||E_{ref}|\sin(\theta-45°) + \tfrac{1}{2}|E_L||E_{ref}|\cos(\theta-45°) \quad \text{[Formula 10]}$$

$$I_{PD4} = \tfrac{1}{4}|E_{sig}|^2 + \tfrac{1}{4}|E_{ref}|^2 - \tfrac{1}{2}|E_G||E_{ref}|\cos(\theta-45°) - \tfrac{1}{2}|E_L||E_{ref}|\sin(\theta-45°) \quad \text{[Formula 11]}$$

From these Formula 8 to Formula 11, a difference value $I_{calc1}$ and a difference value $I_{calc2}$ of the embodiment are expressed by Formula 12 and Formula 13 respectively.

$$I_{calc1} = |E_G||E_{ref}|\cos(\theta-45°) - |E_L||E_{ref}|\sin(\theta-45°) \quad \text{[Formula 12]}$$

$$I_{calc2} = |E_G||E_{ref}|\sin(\theta-45°) + |E_L||E_{ref}|\cos(\theta-45°) \quad \text{[Formula 13]}$$

Here, due to surface wobbling of the optical recording medium 1, a phase difference between signal light and reference light periodically changes in a cycle corresponding to a rotation cycle of the optical recording medium 1.

FIG. 12 illustrates waveforms of a difference value $I_{calc1}$ ($I_{PD1}-I_{PD2}$) and a difference value $I_{calc2}$ ($I_{PD3}-I_{PD4}$) in a case in which surface wobbling occurs. In FIG. 12, a horizontal axis represents a phase difference ($\theta-\phi_{ref}$) between signal light and reference light and a vertical axis represents signal intensity. Here, the horizontal axis can be replaced with a temporal axis.

FIG. 12 illustrates waveforms of a case in which the optical recording medium 1 moves in a direction going away from an optical head which radiates laser light for reproduction. In this case, a vector of a composite component M rotates in a positive angle direction in a phase space as depicted in FIG. 9B above.

As depicted in FIG. 12, waveforms of the difference value $I_{calc1}$ (a black line in FIG. 12) and the difference value $I_{calc2}$ (a gray line in FIG. 12) are such that high frequency components corresponding to recording signals are respectively superposed on low frequency components which are respectively depicted by a long dashed line and a short dashed line.

These low frequency components which are depicted by the dashed lines correspond to components of a phase difference between signal light and reference light.

Here, the low frequency component, which is depicted by the long dashed line, of the difference value $I_{calc1}$ corresponds to signal light corresponding to the 0° detection ch (signal light of a groove G), that is, a phase difference of reference light with respect to signal light of which a phase is different with respect to synthetic signal light of a groove G and a land L by −45°.

Further, the low frequency component, which is depicted by the short dashed line, of the difference value $I_{calc2}$ corresponds to signal light corresponding to the 90° detection ch (signal light of a land L), that is, a phase difference between signal light of which a phase is different with respect to synthetic signal light by +45°, and reference light.

A value of a phase difference, which is used here, is a value of a phase difference between synthetic signal light and reference light.

A value of a phase difference between synthetic signal light and reference light can be obtained on the basis of the low frequency component, which is depicted by the long dashed line, of the difference value $I_{calc1}$ and the low frequency component, which is depicted by the short dashed line, of the difference value $I_{calc2}$.

Specifically, in the embodiment, difference values $I_{calc1}$ and $I_{calc2}$ are respectively calculated on the basis of light receiving signals, and low pass filter (LPF) processing is respectively performed with respect to the difference values $I_{calc1}$ and $I_{calc2}$ so as to obtain a low frequency component $I_{calc1}\_lpf$ of the difference value $I_{calc1}$ and a low frequency component $I_{calc2}\_lpf$ of the difference value $I_{calc2}$. Then, arctan ($I_{calc2}\_lpf/I_{calc1}\_lpf$) is calculated so as to obtain a value of "θ−45°" as a phase difference between synthetic signal light and reference light.

When a value of the phase difference θ−45° is obtained, rotating coordinate conversion may be performed so that the vector of the composite component M is rotated by θ−45°.

When a detected signal of the 0° detection ch (the difference value $I_{calc1}$ in this example) is denoted as $I_0$, a detected signal of the 90° detection ch (the difference value $I_{calc2}$ in this example) is denoted as $I_{90}$, and respective detected signals of the 0° detection ch and the 90° detection ch after the coordinate conversion are denoted as $I_0'$ and $I_{90}'$, this coordinate conversion is expressed by Formula 14 below which uses a rotating coordinate matrix.

$$\begin{bmatrix} I_0' \\ I_{90}' \end{bmatrix} = \begin{bmatrix} \cos(-\theta+45°) & \sin(-\theta+45°) \\ -\sin(-\theta+45°) & \cos(-\theta+45°) \end{bmatrix} \begin{bmatrix} I_0 \\ I_{90} \end{bmatrix} \quad \text{[Formula 14]}$$

Here, $I_0 = I_{calc1}$ and $I_{90} = I_{calc2}$, so that Formula 14 can be expressed as Formula 15 and Formula 16 below.

$$|E_G||E_{ref}| = I_{calc1}\cos(\theta-45°) + I_{calc2}\sin(\theta-45°) \quad \text{[Formula 15]}$$

$$|E_L||E_{ref}| = I_{calc1}\sin(\theta-45°) + I_{calc2}\cos(\theta-45°) \quad \text{[Formula 16]}$$

That is, reproduction signals of respective recording signals of a groove G and a land L can be obtained by respectively calculating the above Formula 15 and Formula 16 by using the difference value $I_{calc1}$, the difference value $I_{calc2}$, and the value of the phase difference (θ−45°).

According to the reproducing method of the embodiment, recording signals of a land L and a groove G which are formed at a narrow pitch which exceeds an optical limit value can be properly discriminated and read even when surface wobbling occurs.

Thus, reproduction of information which is recorded at a pitch which exceeds an optical limit value is enabled, being able to encourage further increase of recording capacity of the optical recording medium 1.

2-4. Configuration of Reproducing Device

The configuration of the reproducing device according to the embodiment which realizes the above-described reproducing method according to the embodiment is described with reference to FIGS. 13 and 14.

Here, elements which are same as the elements which have already been described are given the same reference characters and the description thereof is omitted in the following description.

Figure 13:
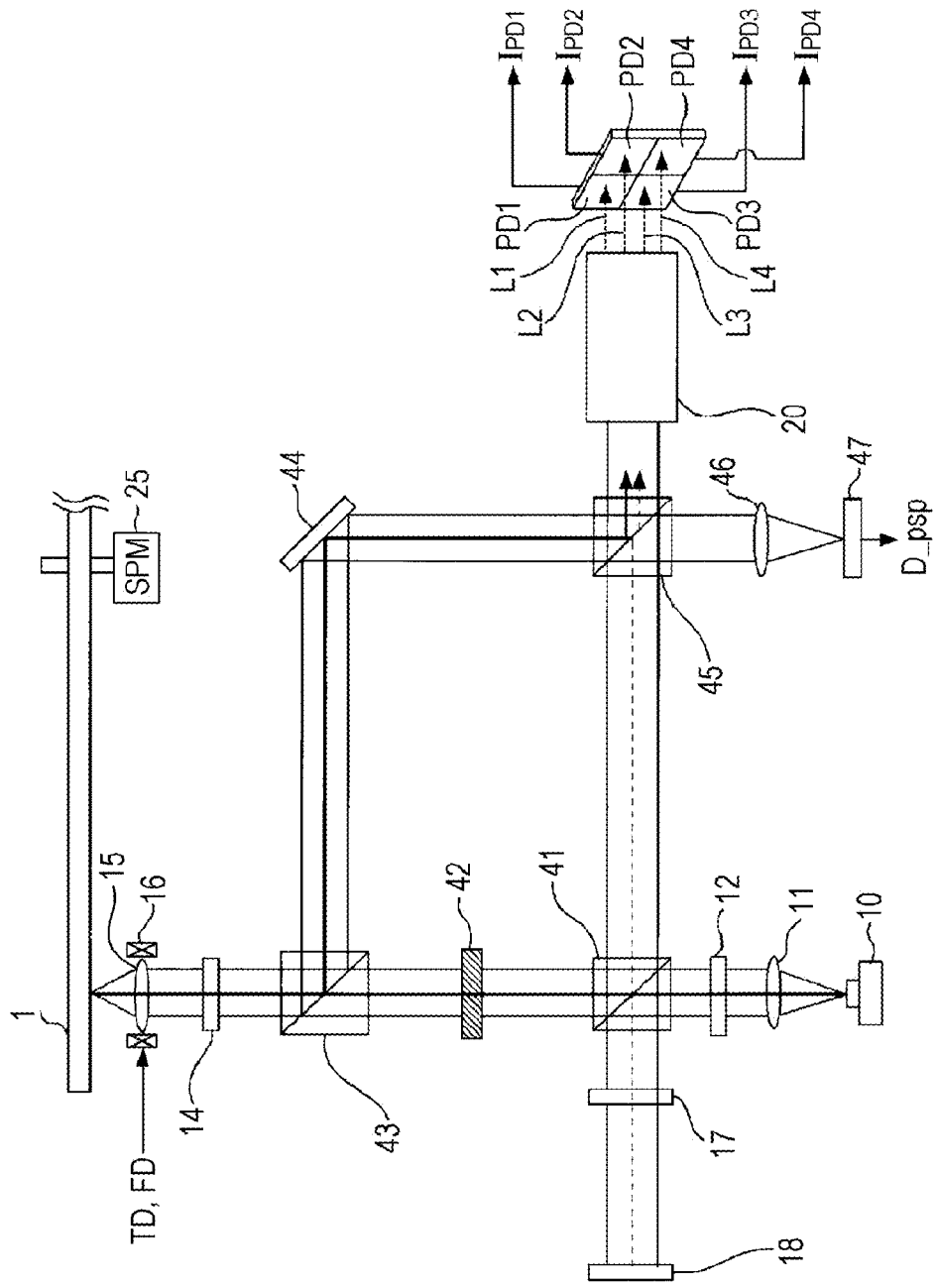
FIG. 13 mainly illustrates the configuration of an optical system which is provided to the reproducing device of the embodiment.

FIG. 13 mainly illustrates the configuration of an optical system which is provided to the reproducing device of the embodiment.

In FIG. 13, laser light emitted from the laser 10 is converted into parallel light via the collimation lens 11 and then passes through the ½ wave plate 12 in this case as well.

In this case, the laser light which has passed through the ½ wave plate 12 is incident on a polarization beam splitter 41.

The polarization beam splitter 41 is configured to permit P polarization to pass therethrough and reflect S polarization, for example, as is the case with the polarization beam splitter 13 described above. In addition, an attachment angle of the ½ wave plate 12 is adjusted so that a spectral ratio of the polarization beam splitter 41 is approximately 1:1 in this case as well.

The laser light which is reflected by the polarization beam splitter 41 passes through a grating 42 so as to be diffracted as depicted in FIG. 13. As understood from the above description of FIG. 8, the 0-th order light is laser light for reproduction and the −1-st order light or +1-st order light is laser light which is to be used for tracking servo control for tracing an intermediate point between a land L and a groove G, in this example.

A diffraction grating pattern in the grating 42 is set so that intervals among a first side spot which is formed on a recording surface of the optical recording medium 1 by the +1-st order light, a second side spot which is formed on the recording surface of the optical recording medium 1 by the −1-st order light, and a reproduction spot which is formed on the recording surface of the optical recording medium 1 by 0-th order light are respectively ½ Tp, as depicted in FIG. 8 above.

The laser light emitted from the grating 42 is incident on a polarization beam splitter 43. This polarization beam splitter 43 is also configured to permit P polarization to pass therethrough and reflect S polarization, as is the case with the polarization beam splitter 41 described above. Accordingly, the laser light emitted from the grating 42 passes through the polarization beam splitter 43.

The laser light which has passed through the polarization beam splitter 43 travels through the ¼ wave plate 14 and then is radiated via the objective lens 15 which is held by the biaxial actuator 16, so as to be condensed on a recording layer 3 of the optical recording medium 1.

In response to the radiation of the laser light with respect to the recording layer 3, reflection light from the recording layer 3 is obtained. The reflection light travels through the objective lens 15 and then the ¼ wave plate 14 so as to be incident on the polarization beam splitter 43.

A polarization direction of the reflection light (return light) incident on the polarization beam splitter 13 is different from a polarization direction of light which is incident from the laser 10 side and passes through the polarization beam splitter 43 (referred to as outward light) by 90°, due to an action by the ¼ wave plate 14 and an action in reflection in the recording layer 3. That is, the reflection light is S polarization and is incident on the polarization beam splitter 43.

Therefore, the above-mentioned reflection light serving as the return light is reflected by the polarization beam splitter 43.

The reflection light serving as the return light which is reflected by the polarization beam splitter 43 is reflected by a mirror 44 in a manner that an optical axis of the reflection light is bent by 90° as depicted in FIG. 13, so as to be incident on the polarization beam splitter 45.

The polarization beam splitter 45 is configured to reflect part of S polarization light and permit approximately 100% of P polarization light to pass therethrough.

Accordingly, a part of the reflection light which has traveled via the mirror 44 to be incident as described above is reflected by the polarization beam splitter 45 and another part of the reflection light passes through the polarization beam splitter 45.

Here, the reflection light which has passed through the polarization beam splitter 45 is incident on a position control light receiving system which is composed of a condenser lens 46 and a side spot light receiving unit 47 which are depicted in FIG. 13.

In the position control light receiving system, the side spot light receiving unit 47 is disposed to receive either one of reflection light of −1-st order light and reflection light of +1-st order light which are included in the reflection light which passes through the polarization beam splitter 45 and is incident on the side spot light receiving unit 47.

Specifically, the side spot light receiving unit 47 of this case is provided with a quarter detector so as to generate a tracking error signal TE and a focus error signal FE. A disposing position of the side spot light receiving unit 47 is set so that a center of a spot, which is formed on a light receiving surface of the side spot light receiving unit 47, of reflection light of the −1-st order light or the +1-st order light is accorded with an intersection (center point) of crisscross dividing lines of this quarter detector, when a center of a side spot is accorded with a center of a land L or a groove G.

Here, a light receiving signal obtained by the side spot light receiving unit 47 is denoted as a light receiving signal D_psp below.

Further, the reflection light which is reflected by the polarization beam splitter 45 is incident on the homodyne detection optical system 20 as depicted in FIG. 13.

Further, laser light which is emitted by the laser 10 and is reflected by the polarization beam splitter 41 (S polarization) described above travels through the ¼ wave plate 17, is reflected by the mirror 18, and then passes through the ¼ wave plate 17 again as reference light in the homodyne detection method, as depicted in FIG. 13. Then, the laser light enters the polarization beam splitter 41 as depicted in FIG. 13.

Here, a polarization direction of the reflection light (return light) incident on the polarization beam splitter 41 is different from that of reference light serving as the outward light by 90° due to an action by the ¼ wave plate 17 and an action in reflection by the mirror 18 (that is, the reflection light is P polarization). Accordingly, the reference light serving as the return light passes through the polarization beam splitter 41.

The reference light which has passed through the polarization beam splitter 41 enters the polarization beam splitter 45.

The reference light which has passed through the polarization beam splitter 41 is incident on a face, which is on an opposite side of a face on which the above-mentioned reflection light from the optical recording medium 1 is incident, of a selective reflection film included in the polarization beam splitter 45, as depicted in FIG. 13.

As described above, the polarization beam splitter 45 is configured to permit approximately 100% of P polarization to pass therethrough, so that the above-mentioned reference light passes through the polarization beam splitter 45 so as to be incident on the homodyne detection optical system 20.

Here, reference light which thus passes through the polarization beam splitter 45 is depicted by a dashed arrow in FIG. 13.

Further, light which is reflected by the polarization beam splitter 45 as described above is depicted by a solid arrow in FIG. 13.

In the reflection light, which is depicted by the solid arrow, of the polarization beam splitter 45, reflection light from a reproduction spot corresponds to the above-described synthetic signal light of a land L and a groove G.

The synthetic signal light and the reference light are emitted from the polarization beam splitter 45 in the same direction in a manner to be superposed on each other. Specifically, the synthetic signal light (reflection light of a reproduction spot) and the reference light are emitted in the same direction in a superposed manner so that optical axes of the synthetic signal light and the reference light are accorded with each other, in this case as well.

Such superposed light of synthetic signal light and reference light is incident on the homodyne detection optical system 20.

The configuration of the homodyne detection optical system 20 is same as the configuration which has been described above with reference to FIG. 3 and FIGS. 4A and 4B. Accordingly, by the homodyne detection optical system 20 of this case, the light beam L1 which is obtained by providing a phase difference of 0° to the superposed light of the synthetic signal light and the reference light which is incident from the polarization beam splitter 45 is condensed on a detection face of the first light detection unit PD1, the light beam L2 which is obtained by providing a phase difference of 180° to the superposed light is condensed on a detection face of the second light detection unit PD2, the light beam L3 which is obtained by providing a phase difference of 90° to the superposed light is condensed on a detection face of the third light detection unit PD3, and the light beam L4 which is obtained by providing a phase difference of 270° to the superposed light is condensed on a detection face of the fourth light detection unit PD4.

Figure 14:
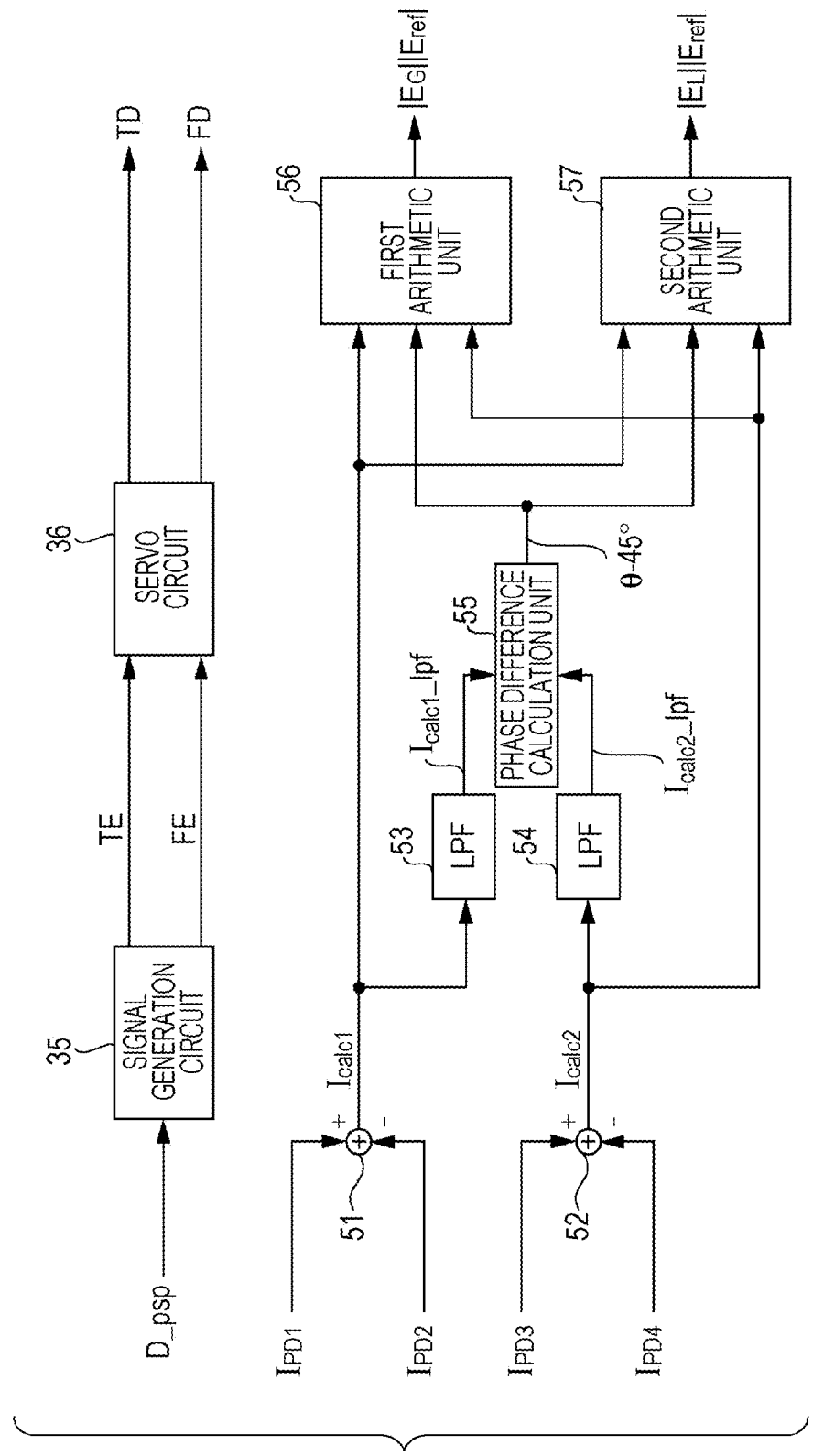
FIG. 14 is a block diagram illustrating the configurations of a signal generation system and a servo control system which are included in the reproducing device of the embodiment.

FIG. 14 is a block diagram illustrating the configurations of a signal generation system and a servo control system which are included in the reproducing device of the embodiment.

The servo control system of this case also includes the signal generation circuit 35 and the servo circuit 36 in a similar manner to the above-described case of FIG. 5. However, the servo control system of this case is different in that a light receiving signal D_psp from the side spot light receiving unit 47 is inputted into the signal generation circuit 35. That is, in the servo control unit of this case, the signal generation circuit 35 generates a tracking error signal TE and a focus error signal FE on the basis of the light receiving signal D_psp. Further, the servo circuit 36 performs drive control of a tracking coil and a focus coil of the biaxial actuator 16 respectively on the basis of a tracking drive signal TD and a focus drive signal FD which are respectively generated on the basis of the tracking error signal TE and the focus error signal FE.

Accordingly, tracking servo control by which a reproduction spot is allowed to trace an intermediate position of a land L and a groove G, as described in FIG. 8 above, is realized.

Further, in this case, as signal processing systems based on the light receiving signals $I_{PD1}$, $I_{PD2}$, $I_{PD3}$, and $I_{PD4}$, a subtractor 51 which calculates a difference value $I_{calc1}$ between the light receiving signal $I_{PD1}$ and the light receiving signal $I_{PD2}$, a subtractor 52 which calculates a difference value $I_{calc2}$ between the light receiving signal $I_{PD3}$ and the light receiving signal $I_{PD4}$, a LPF 53, a LPF 54, a phase difference calculation unit 55, a first arithmetic unit 56, and a second arithmetic unit 57 are provided as depicted in FIG. 14.

The difference value $I_{calc1}$ which is obtained by the subtractor 51 is supplied to the LPF 53, the first arithmetic unit 56, and the second arithmetic unit 57 as depicted in FIG. 14.

Further, the difference value $I_{calc2}$ which is obtained by the subtractor 52 is supplied to the LPF 54, the first arithmetic unit 56, and the second arithmetic unit 57.

The LPF 53 extracts a low frequency component $I_{calc1}\_lpf$ of the difference value $I_{calc1}$. Further, the LPF 54 extracts a low frequency component $I_{calc2}\_lpf$ of the difference value $I_{calc2}$. Here, it is sufficient that a cutoff frequency of these LPF 53 and LPF 54 is set so that at least a component of a recording signal band of the recording layer 3 is removed.

The phase difference calculation unit 55 calculates $$\arctan(I_{calc2}\_lpf/I_{calc1}\_lpf)$$

on the basis of a value of the low frequency component $I_{calc1}\_lpf$ obtained in the LPF 53 and a value of the low frequency component $I_{calc2}\_lpf$ obtained in the LPF 54, so as to obtain a value of the above-mentioned phase difference θ−45°. The value of the phase difference θ−45° is supplied to each of the first arithmetic unit 56 and the second arithmetic unit 57.

The first arithmetic unit 56 performs the calculation expressed in Formula 15 above on the basis of the difference value $I_{calc1}$, the difference value $I_{calc2}$, and the value of the phase difference θ−45° so as to obtain a reproduction signal of a recording signal of a groove G ($|E_G||E_{ref}|$).

Further, the second arithmetic unit 57 performs the calculation expressed in Formula 16 above on the basis of the difference value $I_{calc1}$, the difference value $I_{calc2}$, and the value of the phase difference θ−45° so as to obtain a reproduction signal of a recording signal of a land L ($|E_L||E_{ref}|$).

Here, it has been assumed that a difference between the amount of reflection light from a land L and the amount of reflection light from a groove G is 0, in the above description. However, it is expected that there is a difference between the amount of reflection light from a land L and the amount of reflection light from a groove G in practice.

When a difference between the amount of reflection light from a land L and the amount of reflection light from a groove G is not 0, an offset value α corresponding to a value of the difference between the amounts of reflection light may be added to the phase difference θ−45°.

Specifically, all terms of "θ−45°" may be set as "θ−45°+α" in Formula 15 and Formula 16.

3. ANOTHER EMBODIMENT

Subsequently, another embodiment is described.

In the other embodiment, an effect of surface wobbling is removed not by calculation but by control of a position of the mirror 18 (that is, control of an optical path length of reference light).

The configuration of a reproducing device according to the other embodiment is described with reference to FIGS. 15 and 16.

Figure 15:
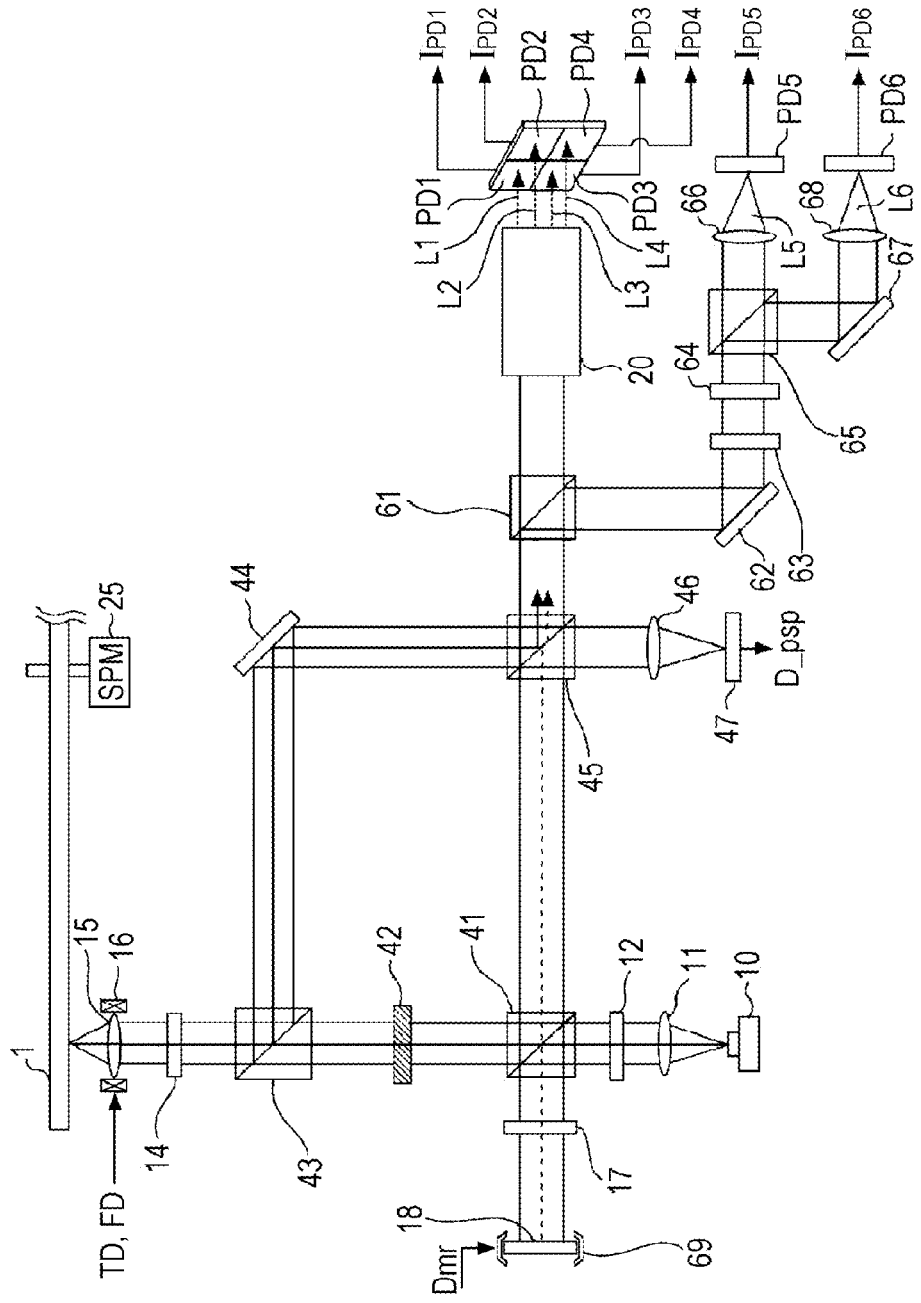
FIG. 15 mainly illustrates the configuration of an optical system which is included in a reproducing device according to another embodiment.

FIG. 15 mainly illustrates the configuration of an optical system which is included in the reproducing device according to the other embodiment.

In comparison with FIG. 12 above, the reproducing device of the other embodiment is different from the reproducing device of the above-described embodiment in that a non-polarization beam splitter 61 is interposed between a polarization beam splitter 45 and a homodyne detection optical system 20, and a light receiving optical system which is composed of a mirror 62, a ½ wave plate 63, a wave plate 64, a polarization beam splitter 65, a condenser lens 66, a mirror 67, a condenser lens 68, a fifth light detection unit PD5, and a sixth light detection unit PD6 is added.

Further, this case is different from the case of the above-described embodiment also in that the mirror 18 for obtaining reference light is made movable by a mirror actuator 69 in FIG. 15.

The non-polarization beam splitter 61 permits a part of superposed light of signal light and reference light, which are emitted from the polarization beam splitter 45, to pass therethrough so as to lead the part to the homodyne detection optical system 20, and reflects another part of the superposed light.

The superposed light which is reflected by the non-polarization beam splitter 61 is reflected by the mirror 62 in a manner that an optical axis of the superposed light is bent by 90° and then is made incident on the polarization beam splitter 65 via the ½ wave plate 63 and the wave plate 64 in this order as depicted in FIG. 15.

Here, the ½ wave plate 63 rotates a polarization direction of incident light by 45° (an action same as that of the ½ wave plate 30 in FIG. 3 described above).

Further, an attachment angle of the wave plate 64 is adjusted so that a phase difference of 45° is provided to signal light and reference light in the superposed light which passes through the polarization beam splitter 65 via the ½ wave plate 63 and this wave plate 64 and a phase difference of 225° is provided to signal light and reference light in the superposed light which is reflected by the polarization beam splitter 65.

The superposed light which passes through the polarization beam splitter 65 is condensed on a detection face of the fifth light detection unit PD5 via the condenser lens 66 (this light beam is denoted as a light beam L5).

Further, the superposed light which is reflected by the polarization beam splitter 65 is reflected by the mirror 67 in a manner that an optical axis of the superposed light is bent by 90° as depicted in FIG. 15 and then is condensed on a detection face of the sixth light detection unit PD6 via the condenser lens 68 (this light beam is denoted as a light beam L6).

Here, a light receiving signal which is obtained by the fifth light detection unit PD5 is denoted as a light receiving signal $I_{PD5}$ and a light receiving signal which is obtained by the sixth light detection unit PD6 is denoted as a light receiving signal $I_{PD6}$.

Figure 16:
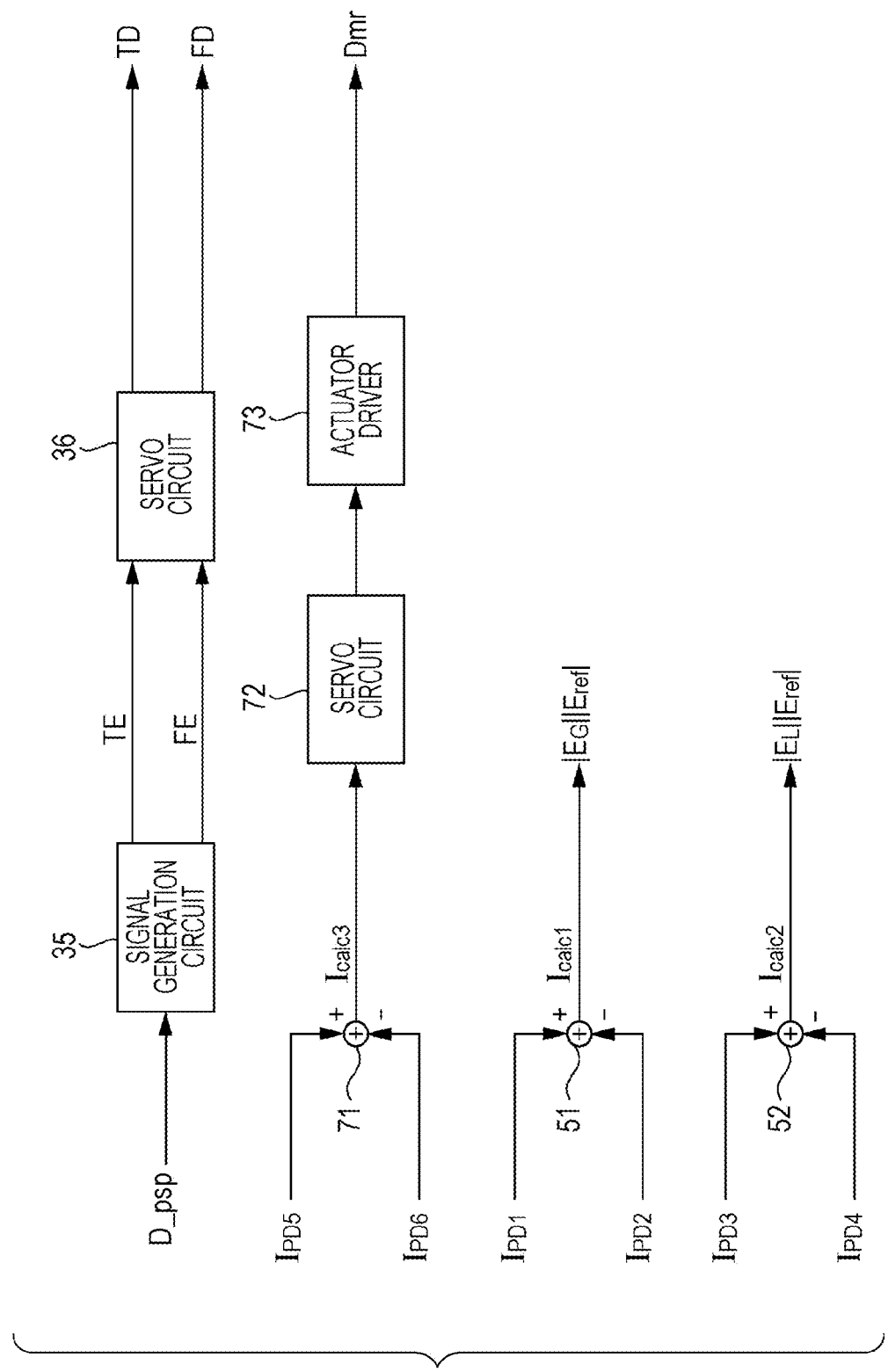
FIG. 16 is a block diagram illustrating the configurations of a signal generation system and a servo control system which are included in the reproducing device according to the other embodiment.

FIG. 16 is a block diagram illustrating the configurations of a signal generation system and a servo control system which are included in the reproducing device according to the other embodiment.

In this case as well, the configuration of the servo system for making a reproduction spot trace an intermediate position between a land L and a groove G (and for performing focus servo control) is same as that of the above-described embodiment (a signal generation circuit 35 and a servo circuit 36 in FIG. 16).

In this case as well, a subtractor 51 which calculates a difference value $I_{calc1}$ between a light receiving signal $I_{PD1}$ and a light receiving signal $I_{PD2}$ and a subtractor 52 which calculates a difference value $I_{calc2}$ between a light receiving signal $I_{PD3}$ and a light receiving signal $I_{PD4}$ are provided as is the case with the reproducing device of the above-described embodiment.

The configuration of a servo system based on the light receiving signal $I_{PD5}$ and the light receiving signal $I_{PD6}$ which are described in FIG. 15 is added in this case. Specifically, a subtractor 71, a servo circuit 72, and an actuator driver 73 in FIG. 16 are added.

The subtractor 71 calculates a difference value $I_{calc3}$ between the light receiving signal $I_{PD5}$ and the light receiving signal $I_{PD6}$.

The servo circuit 72 generates a mirror servo signal for setting the difference value $I_{calc3}$ to a target value=0 on the basis of the difference value $I_{calc3}$.

The actuator driver 73 drives the mirror actuator 69, which is depicted in FIG. 15 above, on the basis of a mirror driving signal Dmr which is based on the mirror servo signal which is obtained in the servo circuit 72.

Here, the mirror actuator 69 holds the mirror 18 so that the mirror 18 is displaceable in a direction parallel with an optical axis of reference light which is incident on the mirror 18. When the mirror actuator 69 is driven by the actuator driver 73 by using the mirror driving signal Dmr which is generated on the basis of the above-mentioned mirror servo signal, the position of the mirror 18 of this case is controlled so that the difference value $I_{calc3}$ (=$I_{PD5}$−$I_{PD6}$) is 0. Consequently, such servo control that an optical path length of the reference light is adjusted so as to satisfy the difference value $I_{calc3}$=0 is realized.

Here, in the other embodiment, a light receiving signal $I_{PD5}$ of a combination of signal light and reference light to which a phase difference of 45° is provided and a light receiving signal $I_{PD6}$ of a combination of signal light and reference light to which a phase difference of 225° is provided are obtained with respect to superposed light of signal light and reference light which are multiplexed and outputted by the polarization beam splitter 45, so as to calculate a difference value $I_{calc3}$ which is a difference between the light receiving signal $I_{PD5}$ and the light receiving signal $I_{PD6}$, as described above.

Figure 17:
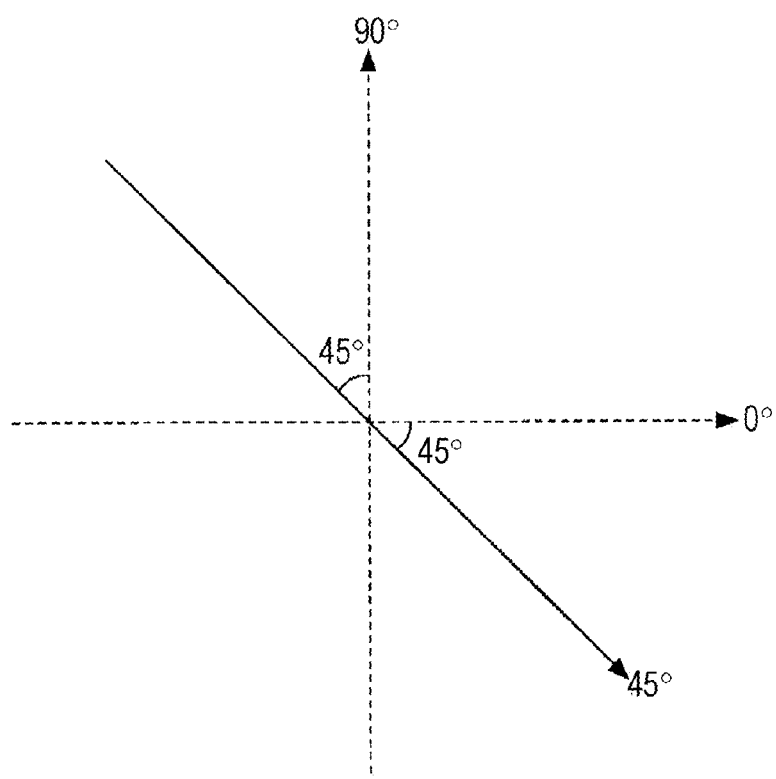
FIG. 17 illustrates 45° detection ch.

This difference value $I_{calc3}$ can be assumed to correspond to a detected signal by a detection ch of 45°, as depicted by a solid line in FIG. 17, in an orthogonal phase space.

As depicted in FIG. 17, this 45° detection axis has an angular difference of 45° with respect to both of a 0° detection axis and a 90° detection axis.

Here, when a phase difference between synthesis signal light and reference light changes due to surface wobbling, a relative angular relation between these detection axes of 0°, 90°, and 45° and a vector of a composite component M changes in an orthogonal phase space.

Figure 18A:
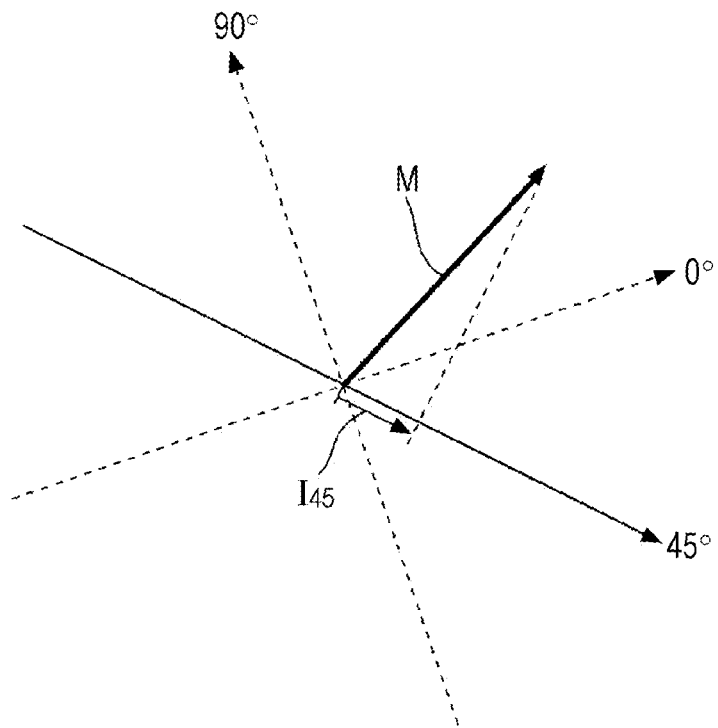
FIGS. 18A and 18B illustrate a reproducing method of the other embodiment.

FIG. 18A illustrates a relation between respective detection axes of 0°, 90°, and 45° and a vector of a composite component M in a case where there is a phase difference between synthesis signal light and reference light.

A detected signal $I_{45}$ of the 45° detection ch, that is, the difference value $I_{calc3}$ does not become 0 in such state that there is a phase difference.

As described above, in the reproducing method of the other embodiment, position control of the mirror 18 is performed so that a value of the difference value $I_{calc3}$ as the detected signal $I_{45}$ of the 45° detection ch becomes 0.

Figure 18B:
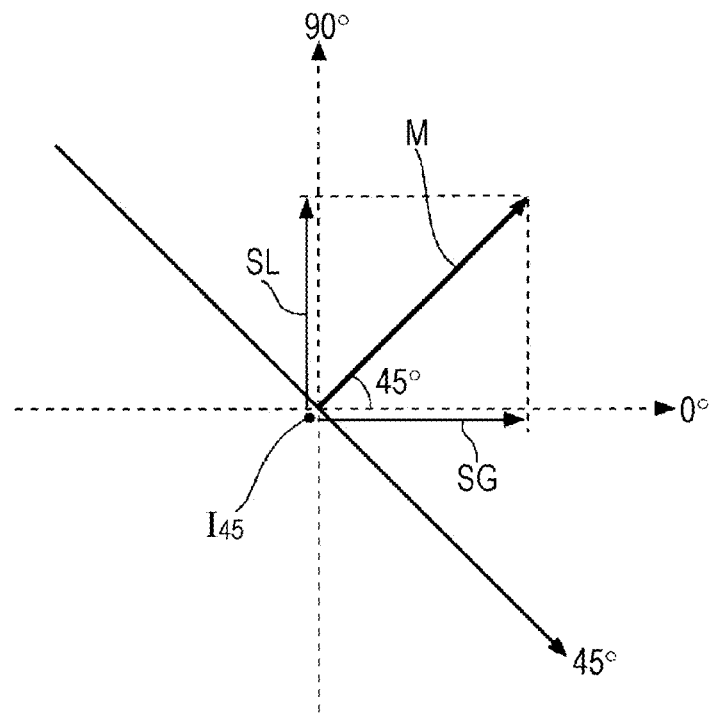

FIG. 18B illustrates a state in which the detected signal $I_{45}$ becomes 0 in an orthogonal phase space.

Apparent from FIG. 18B, the detected signal $I_{45}$, namely, a value of the difference value $I_{calc3}$ becomes 0 when a detection axis of 45° and the vector of the composite component M is orthogonal to each other, that is, when an angle formed by the vector of the composite component M and the detection axis of 0° is 45°.

In FIG. 18B, by performing position control of the mirror 18 so that the difference value $I_{calc3}$ becomes 0 as described above, a state similar to the ideal state depicted in FIG. 9A above can be obtained in the orthogonal phase space. That is, a phase difference between synthetic signal light and reference light can be cancelled.

As a result, according to the other embodiment, a reproduction signal of a recording signal of a groove G can be obtained by calculating the difference value $I_{calc1}$ between the light receiving signal $I_{PD1}$ and the light receiving signal $I_{PD2}$ which serves as a detected signal of the 0° detection ch and a reproduction signal of a recording signal of a land L can be obtained by calculating the difference value $I_{calc2}$ between the light receiving signal $I_{PD3}$ and the light receiving signal $I_{PD4}$ which serves as a detected signal of the 90° detection ch.

Namely, relatively-complicated calculations using sin and cos which are used in the above-described embodiment can be omitted and therefore, processing load can be reduced.

For confirmation, an action which is obtained by the mirror position control of the other embodiment which has been described is expressed by a formula.

First, the difference value $I_{calc3}$ is expressed by Formula 17 below.

$$I_{PD5} - I_{PD6} = \quad \text{[Formula 17]}$$
$$I_{calc3} \propto |E_{ref}| \left\{ |E_G| \cos\left(\theta - 45° + \frac{\pi}{4}\right) + |E_L| \sin\left(\theta - 45° + \frac{\pi}{4}\right) \right\}$$

When the difference value $I_{calc3}$ becomes 0, θ−45°=0 is satisfied.

Accordingly, the difference value $I_{calc1}$ and the difference value $I_{calc2}$ are respectively expressed by Formula 18 and Formula 19 below.

$$I_{calc1} = |E_G||E_{ref}|\cos(\theta - 45°) - |E_L||E_{ref}|\sin(\theta - 45°) \quad \text{[Formula 18]}$$
$$= |E_G||E_{ref}| \times 1 - |E_L||E_{ref}| \times 0$$
$$= |E_G||E_{ref}|$$

$$I_{calc2} = |E_G||E_{ref}|\sin(\theta - 45°) + |E_L||E_{ref}|\cos(\theta - 45°) \quad \text{[Formula 19]}$$
$$= |E_G||E_{ref}| \times 0 + |E_L||E_{ref}| \times 1$$
$$= |E_L||E_{ref}|$$

Namely, from these Formula 18 and Formula 19, it is understood that a reproduction signal ($|E_G||E_{ref}|$) of the recording signal of a groove G can be obtained by calculating the difference value $I_{calc1}$ and a reproduction signal ($|E_L||E_{ref}|$) of the recording signal of a land L can be obtained by calculating the difference value $I_{calc2}$.

Here, the case in which a control target value of mirror servo based on the difference value $I_{calc3}$ is set to 0 is illustrated in the above description. However, as the target value, predetermined offset may be provided while considering various types of effects of optical noise and the like, for example.

4. MODIFICATION

The embodiments according to the present technology have been described above, but embodiments of the present technology are not to be limited to the specific examples which have been described thus far.

For example, a value of a level difference d is set so that a phase difference of 90° is provided to reflection light of a groove G and a land L in the description above. However, a value of a level difference d is not to be limited to a value at which a phase difference of reflection light of a groove G and a land L is exactly 90°, but a little gap is permitted. That is, as understood from a reproduction principle of the embodiments of the present technology which has been described thus far, even if a phase difference of reflection light of a groove G and a land L is slightly different from 90°, recording signals of a groove G and a land L can be discriminated and read. Therefore, it is sufficient that a value of a level difference d is set so that a phase difference of reflection light of a groove G and a land L is approximately 90°.

In a similar manner, the case in which phase differences which are provided between signal light and reference light by the detection optical system are set to 0°, 180°, 90°, 270°, 45°, and 225° respectively has been illustrated. However, the phase differences do not have to be exactly accorded with these numerals, but slight gap is permitted in a point enabling discrimination and reading of recording signals of a groove G and a land L. Namely, in this point, it is sufficient to set phase differences which are provided between signal light and reference light by the detection optical system to approximately 0°, approximately 180°, approximately 90°, approximately 270°, approximately 45°, and approximately 225° respectively.

Further, regarding the configuration of an optical system, it is sufficient to arbitrarily employ the optimum configuration in accordance with an actual embodiment, and the configuration is not to be limited to the configuration which has been thus far.

For example, in the description above, such case is employed that a polarization beam splitter is used as an optical element for separating reflection light of 0-th order light and 1-st order light which are obtained from the optical recording medium 1 into light for homodyne detection and light for side spot detection, in a case where the tracking servo control technique for tracing an intermediate position between a land L and a groove G is employed. However, other optical elements other than a polarization beam splitter can be used for realizing the spectral separation of course.

Further, in the above description, the case in which differential detection is performed by using a combination of respective light receiving signals in which a difference between a phase of signal light and a phase of reference light is 180° has been illustrated, but differential detection does not have to be performed in the embodiments of the present technology.

Further, in the above description, such case is illustrated that the tracking servo control which permits a beam spot of laser light for reproduction to trace an intermediate position between a land L and a groove G is performed so as to enable simultaneous reading of recording signals of a land L and a groove G. However, a tracking servo control technique which is to be employed for discriminating and reading a recording signal of a land L and a recording signal of a groove G is not to be limited to the method illustrated above.

For example, such method can be employed that an operation for reproducing a recording signal of a groove G is performed by using a difference value $I_{calc1}$ while tracking servo is performed with respect to the groove G with laser light for reproduction, and then an operation for reproducing a recording signal of a land L is performed by using a difference value $I_{calc2}$ while tracking servo is performed with respect to the land L. Namely, recording signals of a groove G and a land L are reproduced by so-called double reading. As understood from the above description as well, a crosstalk component caused by a recording signal component of a land L can be cancelled in a reproduction operation based on the difference value $I_{calc1}$ in a state of performing tracking servo with respect to a groove G, and a crosstalk component caused by a recording signal component of a groove G can be cancelled in a reproduction operation based on the difference value $I_{calc2}$ in a state of performing tracking servo with respect to a land L, as described above.

As mentioned above, a tracking servo method for discriminating and reading a signal of a land L and a signal of a groove G which are recorded at a narrow pitch is not to be limited to the method for tracing an intermediate position between a land L and a groove G illustrated above.

Further, in the description above, the case where an optical recording medium which is a reproduction target is a ROM-type optical recording medium has been illustrated. However, embodiments of the present technology are favorably widely applicable to general optical recording media and of course, are favorably applicable for signal reproduction of recordable optical recording media, as well.

Embodiments of the present technology may also have the following configurations.

(1)

A reproducing device includes a light generation and emission unit that obtains signal light as reflection light, which reflects both of recording signals of a land and a groove, by irradiating an optical recording medium, in which a signal is recorded in both of the land and the groove and in which a level difference between the land and the groove is set so as to provide a phase difference of approximately 90° to reflection light from the land and reflection light from the groove, with light emitted from a light source, and generates reference light as coherent light by making the light emitted from the light source be reflected by a mirror, so as to emit the signal light and the reference light in a superposed manner, a detection optical system configured to generate a first combination of signal light and reference light, which is obtained by providing a phase difference of approximately 0° to superposed light of the signal light and the reference light, which is emitted by the light generation and emission unit, a second combination of signal light and reference light, which is obtained by providing a phase difference of approximately 180° to the superposed light, a third combination of signal light and reference light, which is obtained by providing a phase difference of approximately 90° to the superposed light, and a fourth combination of signal light and reference light, which is obtained by providing a phase difference of approximately 270° to the superposed light, respectively, a light receiving unit in which the first combination of signal light and reference light, the second combination of signal light and reference light, the third combination of signal light and reference light, and the fourth combination of signal light and reference light are respectively received by a first light receiving element, a second light receiving element, a third light receiving element, and a fourth light receiving element, and a reproduction unit configured to reproduce the recording signal of the land and the recording signal of the groove on the basis of a first light receiving signal that is obtained by the first light receiving element, a second light receiving signal that is obtained by the second light receiving element, a third light receiving signal that is obtained by the third light receiving element, and a fourth light receiving signal that is obtained by the fourth light receiving element.

(2)

In the reproducing device according to (1), the reproduction unit calculates a first differential signal that is a difference between the first light receiving signal and the second light receiving signal and a second differential signal that is a difference between the third light receiving signal and the fourth light receiving signal and reproduces the recording signal of the land and the recording signal of the groove on the basis of the first differential signal and the second differential signal.

(3)

In the reproducing device according to (1) or (2), a phase difference of the signal light and the reference light, which are emitted by the light generation and emission unit, is cancelled by calculation or control of a position of the mirror.

(4)

In the reproducing device according to (3), when a first low frequency signal that is a signal obtained by extracting a low frequency component of the first differential signal is denoted as I1_lpf and a second low frequency signal that is a signal obtained by extracting a low frequency component of the second differential signal is denoted as I2_lpf, the reproduction unit calculates $$\arctan(I2\_lpf/I1\_lpf)$$

so as to obtain a value of the phase difference of the signal light and the reference light, which are emitted by the light generation and emission unit, and perform calculation for cancelling the phase difference by using the value.

(5)

In the reproducing device according to (4), when a value of the first differential signal, a value of the second differential signal, and a value of a difference between the first low frequency signal and the second low frequency signal are respectively denoted as I1, I2, and X, the reproduction unit performs calculations expressed as $$I1 \cdot \cos X + I2 \cdot \sin X$$

and $$-I1 \times \sin X + I2 \times \cos X$$

so as to obtain a reproduction signal of the recording signal of the land and a reproduction signal of the recording signal of the groove.

(6)

The reproducing device according to (3) further includes a mirror position control unit that performs position control of the mirror so that a difference value between a fifth light receiving signal that is obtained by a fifth light receiving element and a sixth light receiving signal that is obtained by a sixth light receiving element becomes a predetermined target value, in which the detection optical system further generates a fifth combination of signal light and reference light, which is obtained by providing a phase difference of approximately 45° to superposed light of the signal light and the reference light, which is emitted by the light generation and emission unit, and a sixth combination of signal light and reference light, which is obtained by providing a phase difference of approximately 225° to the superposed light, and the light receiving unit receives the fifth combination of signal light and reference light and the sixth combination of signal light and reference light respectively by the fifth light receiving element and the sixth light receiving element.

(7)

The reproducing device according to any one of (1) to (6) further includes a tracking servo control unit configured to perform tracking servo control of an objective lens on the basis of a light receiving signal of second light, in which the light generation and emission unit is configured to radiate light, which is emitted from the light source, with respect to the optical recording medium via the objective lens, and radiate first light for obtaining the signal light and the second light by which a beam spot is formed on a position that is displaced in a tracking direction by a half length of a formation pitch of the land and the groove with respect to a beam spot that is formed by the first light on the optical recording medium, via the objective lens.

The present disclosure contains subject matter related to that disclosed in Japanese Priority Patent Application JP 2012-173960 filed in the Japan Patent Office on Aug. 6, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing device, comprising:
a light generation and emission unit that obtains signal light as reflection light, the reflection light reflecting both of recording signals of a land and a groove, by irradiating an optical recording medium, in which a signal is recorded in both of the land and the groove and a level difference between the land and the groove is set so as to provide a phase difference of approximately 90° to reflection light from the land and reflection light from the groove, with light emitted from a light source, and generates reference light as coherent light by making the light emitted from the light source be reflected by a mirror, so as to emit the signal light and the reference light in a superposed manner;
a detection optical system configured to generate a first combination of signal light and reference light, the first combination being obtained by providing a phase difference of approximately 0° to superposed light of the signal light and the reference light, the superposed light being emitted by the light generation and emission unit, a second combination of signal light and reference light, the second combination being obtained by providing a phase difference of approximately 180° to the superposed light, a third combination of signal light and reference light, the third combination being obtained by providing a phase difference of approximately 90° to the superposed light, and a fourth combination of signal light and reference light, the fourth combination being obtained by providing a phase difference of approximately 270° to the superposed light, respectively;
a light receiving unit in which the first combination of signal light and reference light, the second combination of signal light and reference light, the third combination of signal light and reference light, and the fourth combination of signal light and reference light are respectively received by a first light receiving element, a second light receiving element, a third light receiving element, and a fourth light receiving element; and
a reproduction unit configured to reproduce the recording signal of the land and the recording signal of the groove on the basis of a first light receiving signal that is obtained by the first light receiving element, a second light receiving signal that is obtained by the second light receiving element, a third light receiving signal that is obtained by the third light receiving element, and a fourth light receiving signal that is obtained by the fourth light receiving element,
wherein the reproduction unit calculates a first differential signal that is a difference between the first light receiving signal and the second light receiving signal and a second differential signal that is a difference between the third light receiving signal and the fourth light receiving signal and reproduces the recording signal of the land and the recording signal of the groove on the basis of the first differential signal and the second differential signal;
wherein a phase difference of the signal light and the reference light, the signal light and the reference light being emitted by the light generation and emission unit, is cancelled by calculation or control of a position of the mirror; and
wherein when a first low frequency signal that is a signal obtained by extracting a low frequency component of the first differential signal is denoted as I1_lpf and a second low frequency signal that is a signal obtained by extracting a low frequency component of the second differential signal is denoted as I2_lpf, the reproduction unit calculates $$\arctan(I2\_lpf/I1\_lpf)$$

so as to obtain a value of the phase difference of the signal light and the reference light, the signal light and the reference light being emitted by the light generation and emission unit, and perform calculation for cancelling the phase difference by using the value.

2. The reproducing device according to claim 1, wherein when a value of the first differential signal, a value of the second differential signal, and a value of a difference between the first low frequency signal and the second low frequency signal are respectively denoted as I1, I2, and X, the reproduction unit performs calculations expressed as $$I1 \cdot \cos X + I2 \cdot \sin X$$

and $$-I1 \times \sin X + I2 \times \cos X$$

so as to obtain a reproduction signal of the recording signal of the land and a reproduction signal of the recording signal of the groove.

3. A reproducing device, comprising:
a light generation and emission unit that obtains signal light as reflection light, the reflection light reflecting both of recording signals of a land and a groove, by irradiating an optical recording medium, in which a signal is recorded in both of the land and the groove and a level difference between the land and the groove is set so as to provide a phase difference of approximately 90° to reflection light from the land and reflection light from the groove, with light emitted from a light source, and generates reference light as coherent light by making the light emitted from the light source be reflected by a mirror, so as to emit the signal light and the reference light in a superposed manner;
a detection optical system configured to generate a first combination of signal light and reference light, the first combination being obtained by providing a phase difference of approximately 0° to superposed light of the signal light and the reference light, the superposed light being emitted by the light generation and emission unit, a second combination of signal light and reference light, the second combination being obtained by providing a phase difference of approximately 180° to the superposed light, a third combination of signal light and reference light, the third combination being obtained by providing a phase difference of approximately 90° to the superposed light, and a fourth combination of signal light and reference light, the fourth combination being obtained by providing a phase difference of approximately 270° to the superposed light, respectively;

a light receiving unit in which the first combination of signal light and reference light, the second combination of signal light and reference light, the third combination of signal light and reference light, and the fourth combination of signal light and reference light are respectively received by a first light receiving element, a second light receiving element, a third light receiving element, and a fourth light receiving element;

a reproduction unit configured to reproduce the recording signal of the land and the recording signal of the groove on the basis of a first light receiving signal that is obtained by the first light receiving element, a second light receiving signal that is obtained by the second light receiving element, a third light receiving signal that is obtained by the third light receiving element, and a fourth light receiving signal that is obtained by the fourth light receiving element; and a mirror position control unit that performs position control of the mirror so that a difference value between a fifth light receiving signal that is obtained by a fifth light receiving element and a sixth light receiving signal that is obtained by a sixth light receiving element becomes a predetermined target value, wherein the reproduction unit calculates a first differential signal that is a difference between the first light receiving signal and the second light receiving signal and a second differential signal that is a difference between the third light receiving signal and the fourth light receiving signal and reproduces the recording signal of the land and the recording signal of the groove on the basis of the first differential signal and the second differential signal;

wherein a phase difference of the signal light and the reference light, the signal light and the reference light being emitted by the light generation and emission unit, is cancelled by calculation or control of a position of the mirror;

wherein the detection optical system further generates a fifth combination of signal light and reference light, the fifth combination being obtained by providing a phase difference of approximately 45° to superposed light of the signal light and the reference light, the signal light and the reference light being emitted by the light generation and emission unit, and a sixth combination of signal light and reference light, the sixth combination being obtained by providing a phase difference of approximately 225° to the superposed light, and the light receiving unit receives the fifth combination of signal light and reference light and the sixth combination of signal light and reference light respectively by the fifth light receiving element and the sixth light receiving element.

4. The reproducing device according to claim 1, further comprising:

a tracking servo control unit configured to perform tracking servo control of an objective lens on the basis of a light receiving signal of second light;

wherein the light generation and emission unit is configured to radiate light, the light being emitted from the light source, with respect to the optical recording medium via the objective lens, and radiate first light for obtaining the signal light and the second light by which a beam spot is formed on a position that is displaced in a tracking direction by a half length of a formation pitch of the land and the groove with respect to a beam spot that is formed by the first light on the optical recording medium, via the objective lens.

* * * * *